United States Patent
Nagasaki et al.

(10) Patent No.: US 10,622,131 B2
(45) Date of Patent: Apr. 14, 2020

(54) SOLENOID DEVICE

(71) Applicant: DENSO CORPORATION, Kariya, Aichi-pref. (JP)

(72) Inventors: Kanehisa Nagasaki, Kariya (JP); Motoyoshi Ando, Kariya (JP)

(73) Assignee: DENSO CORPORATION, Kariya (JP)

( * ) Notice: Subject to any disclaimer, the term of this patent is extended or adjusted under 35 U.S.C. 154(b) by 17 days.

(21) Appl. No.: 16/154,800

(22) Filed: Oct. 9, 2018

(65) Prior Publication Data

US 2019/0108934 A1  Apr. 11, 2019

(30) Foreign Application Priority Data

Oct. 11, 2017  (JP) .................................. 2017-197535

(51) Int. Cl.
| | |
|---|---|
| *H01F 7/13* | (2006.01) |
| *H01F 7/08* | (2006.01) |
| *F16K 31/06* | (2006.01) |
| *H01F 7/16* | (2006.01) |
| *F16K 11/07* | (2006.01) |

(52) U.S. Cl.
CPC ................ *H01F 7/13* (2013.01); *F16K 11/07* (2013.01); *F16K 31/0613* (2013.01); *F16K 31/0675* (2013.01); *H01F 7/081* (2013.01); *H01F 7/1607* (2013.01); *H01F 2007/085* (2013.01)

(58) Field of Classification Search
CPC .......... H01F 7/13; H01F 7/1607; H01F 7/081; H01F 2007/085; F16K 11/07; F16K 31/0613; F16K 31/0675
See application file for complete search history.

(56) References Cited

U.S. PATENT DOCUMENTS

| | | | | | |
|---|---|---|---|---|---|
| 5,687,698 | A | * | 11/1997 | Mastro ................... | H01F 7/1607 123/568.26 |
| 6,864,771 | B2 | * | 3/2005 | Komiyama ............... | F01N 3/22 251/129.15 |
| 7,468,647 | B2 | * | 12/2008 | Ishibashi ............. | F16K 31/0613 251/129.15 |
| 7,688,169 | B2 | * | 3/2010 | Zhao ..................... | H01F 7/1607 310/12.01 |
| 9,318,246 | B2 | * | 4/2016 | Irie .......................... | H01F 3/00 |
| 9,631,735 | B2 | * | 4/2017 | Peterson ............. | F16K 31/0644 |
| 9,646,754 | B2 | * | 5/2017 | Saiki ................... | F16K 31/0613 |
| 9,869,399 | B2 | * | 1/2018 | Schudt ................ | F16H 61/0251 |
| 2002/0175569 | A1 | | 11/2002 | Komiyama et al. | |

(Continued)

*Primary Examiner* — Eric Keasel
(74) *Attorney, Agent, or Firm* — Nixon & Vanderhye PC

(57) ABSTRACT

In a diameter-increasing portion, which includes first to third angle segments, an A-point is defined as an intersection between a radially outer surface of a thin wall portion and the first angle segment, and a B-point is defined as an intersection between a radially outer surface of a thick wall portion and the third angle segment. Radially outer surfaces of the first to third angle segments are located on a radially outer side of a reference conical surface, which is formed by rotating a straight line connecting between the A-point and the B-point about a central axis, throughout an entire range from the A-point to the B-point. A first angle $\alpha$, a second angle $\beta$, a third angle $\gamma$ and a reference angle $\theta$ satisfy relationships of "$\alpha \geq \theta$, $\theta \geq \gamma$, $\theta > \beta$", and "$\alpha \geq \gamma > \beta$".

6 Claims, 17 Drawing Sheets

(56) References Cited

U.S. PATENT DOCUMENTS

| | | | |
|---|---|---|---|
| 2009/0032753 A1* | 2/2009 | Ishibashi | H01F 7/081 251/129.15 |
| 2012/0268225 A1* | 10/2012 | Mahajan | H01F 7/13 335/261 |
| 2015/0179322 A1 | 6/2015 | Irie et al. | |
| 2018/0156348 A1* | 6/2018 | Hofmann | F16K 31/0675 |

* cited by examiner

SOLENOID DEVICE

CROSS REFERENCE TO RELATED APPLICATION

This application is based on and incorporates herein by reference Japanese Patent Application No. 2017-197535 filed on Oct. 11, 2017.

TECHNICAL FIELD

The present disclosure relates to a solenoid device.

BACKGROUND

According to a previously known technique, in a solenoid device, a plunger is moved in an axial direction along an inner wall of a stator core shaped into a cylindrical tubular form through energization of a solenoid. According to this technique, the cylindrical tubular form of the stator core is adjusted to adjust a change in an attractive force for attracting the plunger in conformity with a stroke position of the plunger.

For example, in the solenoid drive device disclosed in JP6094309B2 (corresponding to US2015/0179322A1), at the core main attracting portion of the solenoid, a conical surface, which passes two points, i.e., a start point of a taper from a magnetic flux limiting thin wall portion and an end point of the taper along a cylindrical tubular portion (the end point of the taper corresponding to an ON-position of the plunger), is defined as an imaginary conical surface that serves as a reference. Here, the core main attracting portion is configured such that a radially inner side of the imaginary conical surface is in a form of a recess, and a radially outer side of the imaginary conical surface is in a form of a projection. In this case, the core main attracting portion is configured into a taper form that includes the recess, which is located on the radially inner side of the imaginary conical surface, and the projection, which is located on the radially outer side of the imaginary conical surface.

Furthermore, in an electromagnetic valve device disclosed in JP3757817B2 (corresponding to US2002/0175569A1), an increase rate of a diameter or an angle of a taper segment at a core main attracting portion of a solenoid decreases in an ON-side moving direction. Alternatively, the taper segment is tapered in a plurality of steps or is in a convex curved surface such that an angle of the taper of the taper segment is reduced in the ON-side moving direction.

A solenoid device, which is applied to the fluid control valve, will be described as an example. In the configuration of the core main attracting portion according to the previously proposed technique, an attractive force characteristic is set such that a high attractive force is obtained at a center section, which is spaced from the OFF-end of the stroke toward the ON-side, i.e., the high attractive force is obtained in a range for controlling the fluid with the valve, and a curve of the attractive force characteristic is in a form of a mountain along the entire stroke range. Furthermore, according to the technique of JP3757817B2 (corresponding to US2002/0175569A1), a relatively flat attractive force characteristic is obtained by increasing the attractive force at the OFF-end side and the ON-end side. It is considered to be beneficial in terms of fluid control with respect to that the amount of change in the attractive force relative to the stroke movement of the plunger becomes small.

However, in the previously proposed technique, the attractive force characteristic becomes such that the attractive force is progressively increased from the OFF-end of the stroke to the center section. With the progressively increasing attractive force characteristic described above, the attractive force at the OFF-end is small at the time of applying a step current of ON to the solenoid, e.g., at the time of applying a response current that shows a first order lag characteristic due to an inductance or a feedback control operation of a drive circuit. Therefore, the time of starting the movement of the plunger from the OFF-end by overcoming the urging load of the spring is delayed. Since the time difference between the time of starting the movement of the plunger from the OFF-end and the time of starting the control operation of the fluid becomes small, the moving speed of the movable member having the weight (e.g., the plunger and/or the valve) at the time of starting the control operation of the fluid, i.e., the time of starting a change in the output characteristic becomes very high. Therefore, due to the high inertial force, which is applied to the movable member, the pressure or the flow rate, which is supposed to be stably controlled, does not immediately converge to the predetermined target value thereof. Thus, there is created an inconvenience, such as generation of overshooting and/or chattering that respectively serve as a transient characteristic, or an inconvenience of forming a start point of continuous pulsations.

SUMMARY

The present disclosure is made in view of the above point, and it is an objective of the present disclosure to provide a solenoid device that limits generation of, for example, overshooting without deteriorating an attractive force.

A solenoid device of the present disclosure includes a coil, which is shaped into a tubular form, a core and a plunger. The core is placed on a radially inner side of the coil and has a plunger-receiving hole that extends along a central axis and has a bottom. The core is configured to generate a magnetic attractive force when the coil is energized. The plunger is received in the plunger-receiving hole and is movable in an ON-side moving direction by the magnetic attractive force of the core from an OFF-end, which is defined as a position of the plunger in a deenergized state of the coil, to an ON-end, which is defined as a position of the plunger where the plunger contacts a stopper provided at a bottom surface of the plunger-receiving hole while the ON-side moving direction is defined as a direction from the OFF-end toward the ON-end along the central axis.

The core includes: a main attracting portion, which has a relatively large wall thickness and is configured to generate the magnetic attractive force; a plunger support portion, which slidably supports the plunger; and one of a thin wall portion and an interrupting portion located between the main attracting portion and the plunger support portion, wherein the thin wall portion has a relatively small wall thickness and is configured to limit a flow of a magnetic flux generated upon energization of the coil, and the interrupting portion interrupts between the main attracting portion and the plunger support portion. An end part of the main attracting portion, which is located at a side where the one of the thin wall portion and the interrupting portion is placed, includes a diameter-increasing portion that has an outer diameter, which is increased in a plurality of steps in a form of a taper from the one of the thin wall portion and the interrupting portion toward a thick wall portion of the main attracting portion.

The diameter-increasing portion has at least three angle segments that include: a first angle segment, which includes a taper-start point located at the side where the one of the thin wall portion and the interrupting portion is placed; a third angle segment, which includes a taper-end point located at a side where the thick wall portion is placed; and a second angle segment, which is located between the first angle segment and the third angle segment.

In an axial cross-section of the diameter-increasing portion, in a case where the thin wall portion is provided between the main attracting portion and the plunger support portion as the one of the thin wall portion and the interrupting portion, an A-point, which is the taper-start point, is defined as an intersection between a radially outer surface of the thin wall portion and the first angle segment. In a case where the interrupting portion is provided between the main attracting portion and the plunger support portion as the one of the thin wall portion and the interrupting portion, the A-point, which is the taper-start point, is defined as an intersection between an inner peripheral surface of the plunger-receiving hole and the first angle segment.

In a case where a radially outer surface of the thick wall portion is parallel with the central axis, a B-point, which is the taper-end point, is defined as an intersection between the radially outer surface of the thick wall portion and the third angle segment. In a case where the radially outer surface of the thick wall portion is not parallel to the central axis while the third angle segment extends in the ON-side moving direction beyond a location of a distal end surface of the plunger held at the ON-end, the B-point, which is the taper-end point, is defined as an intersection between the third angle segment and an imaginary extension line of the distal end surface of the plunger held at the ON-end. A reference conical surface is defined as an imaginary conical surface that is obtained by rotating a straight line, which connects between the A-point and the B-point, about the central axis.

The diameter-increasing portion is configured to satisfy both of a range condition and an angle condition. The range condition is set such that a radially outer surface of the first angle segment, a radially outer surface of the second range angle and a radially outer surface of the third angle segment are located along the reference conical surface or on a radially outer side of the reference conical surface throughout an entire range from the A-point to the B-point.

The angle condition is set as follows:

$$\alpha \geq \theta, \theta \geq \gamma, \theta > \beta$$

$$\alpha \geq \gamma > \beta$$

where:
$\alpha$ denotes a first angle that is a gradient angle of the first angle segment;
$\beta$ denotes a second angle that is a gradient angle of the second angle segment;
$\gamma$ denotes a third angle that is a gradient angle of the third angle segment; and
$\theta$ denotes a reference angle that is a gradient angle of the reference conical surface.

A gradient angle of the ON-side moving direction is defined as zero degrees. The first angle, the second angle, the third angle and the reference angle are respectively assumed to take a positive value when the first angle segment, the second angle segment, the third angle segment and the reference conical surface are tilted from the ON-side moving direction toward a radially outer side.

Effects and advantages of the present disclosure will be described with respect to the example where the solenoid device is applied to the fluid control valve. In the present disclosure, the diameter-increasing portion of the core main attracting portion is in the form of taper that includes at least three angle segments to satisfy the range condition and the angle condition. At the first angle segment that has the first angle $\alpha$, which is the largest angle among the angles of the three angle segments, the attractive force at the OFF-end in the small stroke range is increased.

At the second angle segment that has the second angle $\beta$, which is the smallest angle among the angles of the angle segments, an increase of the magnetic flux energy is limited to reduce a loss in an idling section, which is from the OFF-end to a point of starting the control of the fluid. Therefore, the attractive force characteristic shows the tendency of progressive reduction in the small stroke range. At the third angle segment that has the third angle $\gamma$, which is the second largest angle among the angles of the angle segments, the magnetic flux energy, which has been saved, can be increased in a range that is from the middle to the terminal end of the range, in which the fluid is controlled. Therefore, it is possible to generate the large attractive force.

In the case of the configuration that has the recess, which is radially inwardly recessed from the reference conical surface, like in the techniques of JP6094309B2 (corresponding to US2015/0179322A1) and JP3757817B2 (corresponding to US2002/0175569A1), the magnetic flux energy to be supplied to the a angle segment at the OFF-end is restricted at the recess. Therefore, the advantage of the present disclosure for generating the large attractive force at the range of the OFF-end cannot be achieved.

In contrast, in the solenoid device of the present disclosure, because of the complex taper form of the diameter-increasing portion, it is possible to limit the generation of, for example, the overshooting without deteriorating the attractive force in the stroke range where the fluid is controlled.

BRIEF DESCRIPTION OF THE DRAWINGS

The present disclosure, together with additional objectives, features and advantages thereof, will be best understood from the following description, the appended claims and the accompanying drawings in which:

DETAILED DESCRIPTION

Figure 1:
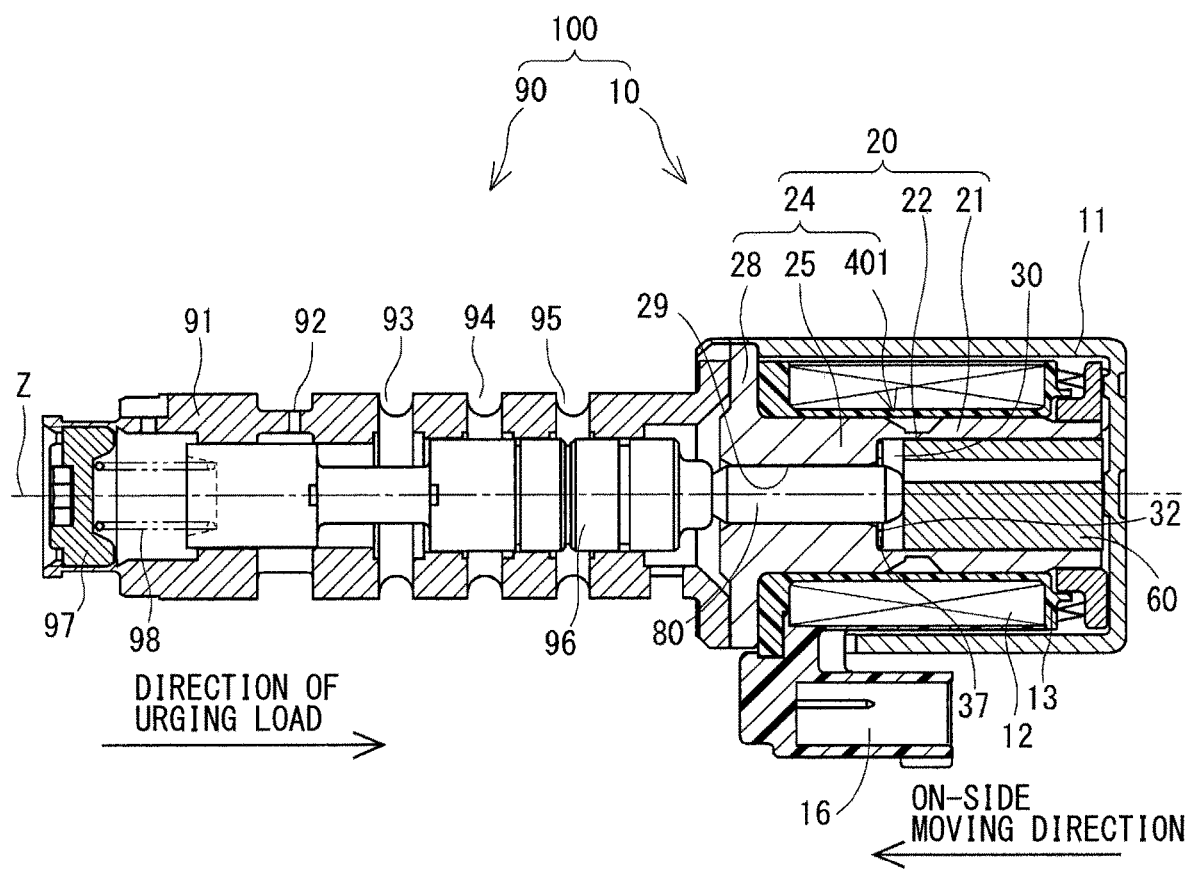
FIG. 1 is an axial cross-sectional view of an oil pressure control valve, in which a solenoid device of a first embodiment is applied.

Hereinafter, embodiments of a solenoid device will be described with reference to the accompanying drawings. In the following embodiments, substantially identical portions will be indicated by the same reference signs and will not be described redundantly for the sake of simplicity. The solenoid device of the present embodiment is an actuator that drives a control valve, which is in a form of a spool valve, in, for example, an oil pressure control valve applied to an oil pressure system of an automatic transmission so as to control a flow rate and a pressure of working oil. Furthermore, as another embodiment, this solenoid device may be applied to a fluid control valve that controls a flow rate and a pressure of another type of fluid that is other than the working oil.

First Embodiment

A first embodiment will be described with reference to FIGS. 1 to 10. First of all, an overall structure of the oil pressure control valve 100 will be described with reference to FIG. 1. The oil pressure control valve 100 includes a control valve 90, which is in a form of a spool valve, and a solenoid device 10, which drives the control valve 90 and is coaxially placed relative to the control valve 90 along a central axis Z. In the control valve 90, a valve (also referred to as a spool) 96 is slidable in an inside of a sleeve 91, which is shaped into a tubular form. The sleeve 91 includes a drain port 92, an output port 93, an input port 94 and a feedback port 95, which radially penetrate through an outer wall and an inner wall of the sleeve 91 and are arranged in this order in the axial direction. Opening and closing of each port 92-95 is selected by a corresponding land and a corresponding groove formed at the outer wall of the valve 96 according to an operational position of the valve 96 that is slid in the inside of the sleeve 91.

A distal end of a shaft 80, which is driven by the solenoid device 10, contacts one end of the valve 96. A load of a spring 98, which is supported by an end plate 97, is applied to the other end of the valve 96 to urge the valve 96 against the shaft 80. When a magnetic attractive force, which is generated by the solenoid device 10, is increased beyond the urging load of the spring 98, the valve 96 is moved toward the end plate 97.

Next, a structure of the solenoid device 10 will be described with reference to FIGS. 1 and 2. The solenoid device 10 includes a case 11, a coil 12, a core 20, a plunger 60 and the shaft 80. In the coil 12, a conductive wire, which is coated with a dielectric coating, is wound around a bobbin 13 made of resin. The case 11, the core 20 and the plunger 60 are made of a magnetic material. When an electric power is supplied from an external electric power source to the coil 12 through a connector portion 16, a magnetic flux flows through a magnetic circuit that passes through the case 11, the core 20 and the plunger 60.

The core 20 is placed on a radially inner side of the coil 12 and has a plunger-receiving hole 30 that extends along the central axis Z and has a bottom. The core 20 is configured to generate the magnetic attractive force when the coil 12 is energized. The core 20 includes: a main attracting portion 24, which has a relatively large wall thickness measured in a radial direction of the central axis Z and is configured to generate the magnetic attractive force; a plunger support portion 21, which slidably supports the plunger 60; and a thin wall portion 22, which has a relatively small wall thickness measured in the radial direction of the central axis Z and is configured to limit a flow of the magnetic flux generated upon the energization of the coil 12. The wall thickness of the thin wall portion 22 measured in the radial direction is the smallest wall thickness in the core 20.

The main attracting portion 24 includes a diameter-increasing portion 401, a thick wall portion 25 and a flange portion 28. The diameter-increasing portion 401 is placed at an end part of the main attracting portion 24, which is located at a side where the thin wall portion 22 is placed. The diameter-increasing portion 401 has an outer diameter that is increased in a plurality of steps in a form of a taper from the thin wall portion 22 toward the thick wall portion 25. Details of the diameter-increasing portion 401 will be described with reference to FIGS. 3A and 3B. The flange portion 28 is clamped between an end surface of the sleeve 91 of the control valve 90 and an end surface of the bobbin 13.

The plunger 60 is received in the plunger-receiving hole 30. The plunger 60 is movable in an ON-side moving direction (a direction of the magnetic attractive force) by the magnetic attractive force of the core 20 from an OFF-end, which is defined as a position of the plunger 60 in a deenergized state of the coil 12, to an ON-end, which is defined as a position of the plunger 60 where the plunger 60 contacts a stopper 37 that is provided at a bottom surface 32 of the plunger-receiving hole 30. Here, the ON-side moving direction is defined as a direction from the OFF-end toward the ON-end along the central axis Z.

The shaft 80 is slidably received in a shaft receiving hole 29 that is formed along the central axis Z of the core 20. One end of the shaft 80 contacts a distal end surface 62 of the plunger 60, and the other end of the shaft 80 contacts an end surface of the valve 96. An urging load from a control subject (e.g., the load of the spring 98 of the control valve 90, a force, which is generated by a feedback pressure of the valve 96, and a fluid force, which is applied to the valve 96), i.e., a reaction force from the control subject is transmitted to the plunger 60 through the shaft 80. When the plunger 60 is moved by the magnetic attractive force in the ON-side moving direction, the drive force of the plunger 60 is transmitted to the valve 96 through the shaft 80.

Figure 3A:
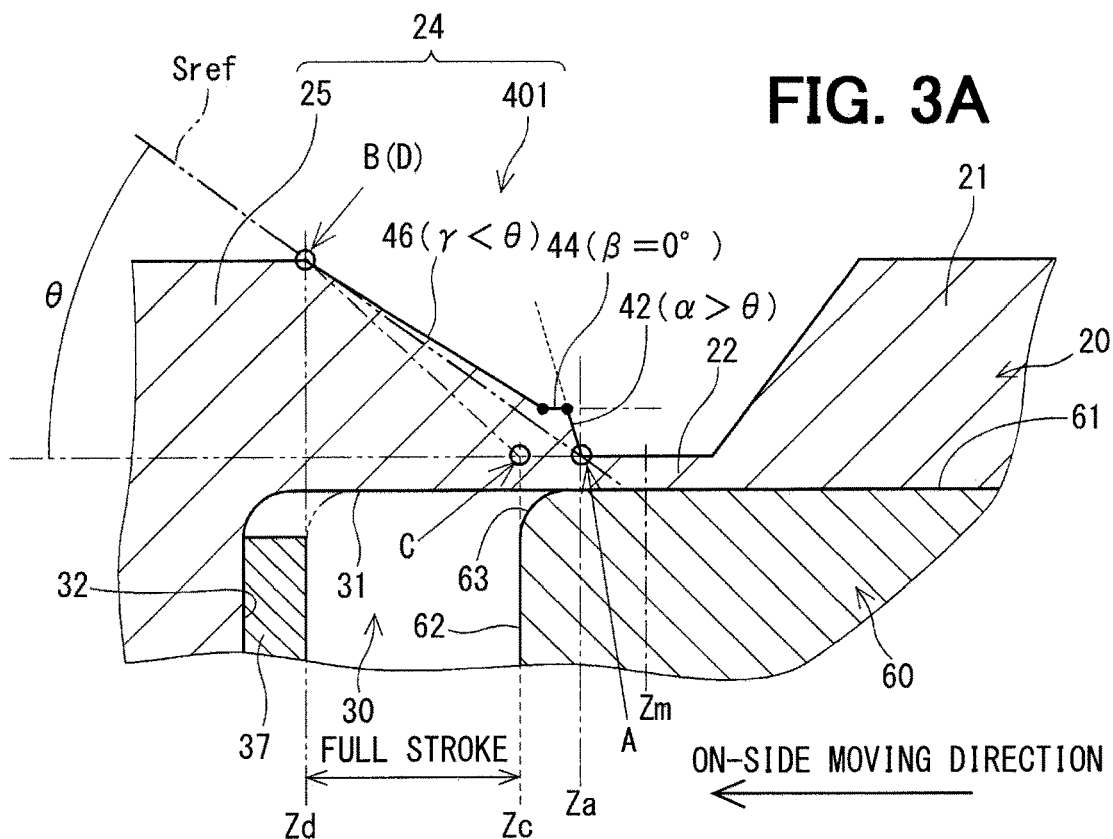
FIG. 3A is a partial enlarged view of the solenoid device corresponding to an area Ma in FIG. 2.
Figure 3B:
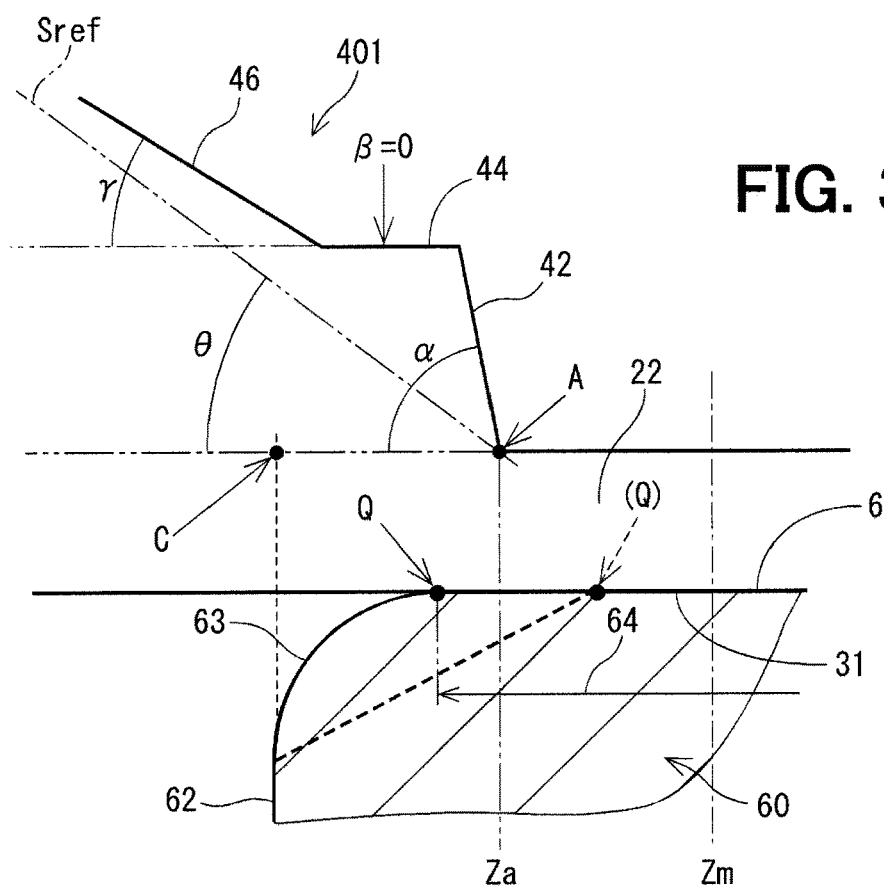
FIG. 3B is a schematic diagram for describing respective gradient angles of segments of a diameter-increasing portion of FIG. 3A.

Next, detailed structure of the distal end portion of the plunger 60 and the main attracting portion 24 of the core 20, particularly the diameter-increasing portion 401 will be described with reference to FIGS. 3A and 3B. Here, it should be noted that the diameter-increasing portion will be indicated by reference signs 401 to 410 in the first to tenth embodiments, respectively. Furthermore, in the following description, the terms "non-energizing time" and "energizing time" refer to "non-energizing time of the coil 12" and "energizing time of the coil 12", respectively. FIGS. 3A and 3B show the operational position of the plunger 60 at the OFF-end at the non-energizing time. At the non-energizing time, the plunger 60 is returned to the OFF-end by the urging load (i.e., the reaction force) applied from the control subject.

A stopper 37, which is shaped into a ring form and is made of a non-magnetic material, is provided to a bottom surface 32 of the plunger-receiving hole 30. The magnetic attractive force, which is generated at the energizing time, drives the plunger 60 to the ON-end, at which the distal end surface 62 of the plunger 60 contacts the stopper 37, while an outer peripheral surface 61 of the plunger 60 is slid along an inner peripheral surface 31 of the plunger-receiving hole 30. A full stroke of the plunger 60 is set to be from a position Zc of the distal end surface 62 of the plunger 60 held at the OFF-end to a position Zd of the distal end surface 62 of the plunger 60 held at the ON-end.

The ON-side moving direction refers to a direction from the OFF-end to the ON-end of the plunger 60, i.e., a direction from the right side to the left side in FIGS. 3A and 3B. Here, it should be understood that the term "ON-side moving direction" should be extended to cover a direction toward the control subject of the solenoid device 10 beyond the end surface position of the stopper 37. A gradient angle (also referred to as a slope angle), which is described below, is defined such that a gradient angle of the ON-side moving direction along the central axis Z is zero degrees, and the gradient angle takes a positive value in a case where a subject line is tilted from the ON-side moving direction (or the central axis Z) toward a radially outer side.

Next, a configuration of the diameter-increasing portion 401 of the first embodiment will be described. The outer diameter of the diameter-increasing portion 401 is increased in the ON-side moving direction in the plurality of steps in the form of the taper from a taper-start point at the thin wall portion 22 side toward a taper-end point at the thick wall portion 25. In the first embodiment, a radially outer surface of the thick wall portion 25 is parallel to the central axis Z. Furthermore, on the premise that the diameter-increasing portion 401 is a solid of revolution (solid figure) centered at the central axis Z, a three-dimensional configuration of the diameter-increasing portion 401 should be specified based on a two-dimensional configuration in an axial cross section of the diameter-increasing portion 401.

The diameter-increasing portion 401 includes three angle segments that include a first angle segment 42, a second angle segment 44 and a third angle segment 46, which are arranged in this order from the taper-start point. The first angle segment 42 includes the taper-start point, and the third angle segment 46 includes the taper-end point. The second angle segment 44 is located between the first angle segment 42 and the third angle segment 46. As shown in FIG. 3B, a gradient angle of the first angle segment 42, a gradient angle of the second angle segment 44 and a gradient angle of the third angle segment 46 will be referred to as a first angle $\alpha$, a second angle $\beta$ and a third angle $\gamma$, respectively.

Furthermore, in the first embodiment, the second angle $\beta$ is zero degrees (0°). Specifically, the radially outer surface of the second angle segment 44 is parallel to the central axis Z. The terms, "zero degrees" and "parallel" should not be strictly construed but should be interpreted to include an error range (tolerance) that is normally assumed in the present technical field. Although the terms "angle segment" and "taper segment" are substantially synonymous to each other, the term "angle segment" should include, besides a segment having an ordinary conical form, a segment having another form that is formed by, for example, a cylindrical surface, which has the gradient angle of zero degrees or a planar surface, which is perpendicular to the central axis Z and has the gradient angle of 90 degrees.

Next, an A-point, a B-point, a C-point and a D-point in the axial cross section of the diameter-increasing portion 401 will be defined. The A-point, which serves as the taper-start point, is defined as an intersection between the radially outer surface of the thin wall portion 22 and the first angle segment 42 (more specifically the radially outer surface of the first angle segment 42). The B-point, which serves as the taper-end point, is defined as an intersection between the radially outer surface of the thick wall portion 25 and the third angle segment 46. Furthermore, the C-point is defined as an intersection between an imaginary extension line of the radially outer surface of the thin wall portion 22 and an imaginary extension line of the distal end surface 62 of the plunger 60 held at the OFF-end. Additionally, the D-point is defined as an intersection between the radially outer surface of the thick wall portion 25 and the imaginary extension line of the distal end surface 62 of the plunger 60 held at the ON-end. As common with the respective embodiments, the C-point is adjacent to the A-point and is located on the ON-end side of the A-point, and the D-point is located at the same position as the B-point or is located at a position that is adjacent to the B-point on the front side or the rear side of the B-point in the axial direction. In the first embodiment shown in FIG. 3A, the D-point coincides with the B-point.

An imaginary conical surface, which is obtained by rotating a straight line connecting between the A-point and the B-point about the central axis, is defined as a reference conical surface Sref. Also, a gradient angle of the reference conical surface Sref is defined as a reference angle $\theta$. The solenoid device 10 of the present embodiment is configured to satisfy the following range condition and the following angle condition with respect to the shape of the diameter-increasing portion 401.

A radially outer surface of the first angle segment 42, a radially outer surface of the second angle segment 44 and a radially outer surface of the third angle segment 46 are located along the reference conical surface Sref or on a radially outer side of the reference conical surface Sref throughout an entire range from the A-point to the B-point. This condition is defined as the range condition. The range condition can be simply rephrased such that the entire range of the diameter-increasing portion 401 outwardly projects from the reference conical surface Sref.

Relationships among the first angle α, the second angle β, the third angle γ and the reference angle θ are defined by the following equation (1). A magnitude relationship among the first angle α, the second angle β and the third angle γ is defined by the following equation (2). The condition, which is expressed by these two equations (1) and (2), is defined as the angle condition. In the first embodiment shown in FIG. 3A, the sign of "≥" (greater than or equal to) in the equations (1) and (2) does not include "=" (equal), so that there is the relationship of α>θ>γ>β. The cases where the sign of "≥" in the equations (1) and (2) becomes "=" are indicated in the eighth and ninth embodiments.

$$\alpha \geq \theta,\ \theta \geq \gamma,\ \theta > \beta \qquad \text{Equation (1)}$$

$$\alpha \geq \gamma > \beta \qquad \text{Equation (2)}$$

Furthermore, a rounded corner portion 63 is formed at a corner between the distal end surface 62 and the outer peripheral surface 61 of the plunger 60. An intersection between the rounded corner portion 63 and a straight portion 64 of the outer peripheral surface 61 of the plunger 60 (the straight portion 64 being defined to have a constant outer diameter) is defined as a straight terminal point and is denoted as a Q-point. Here, the rounded corner portion 63 may be replaced with a chamfered portion (or a bevel).

As shown in FIG. 3B, when the plunger 60 is held at the OFF-end, the Q-point is axially placed on a side of an axial center position (or simply referred to as a center position) Zm of the thin wall portion 22 where the distal end surface 62 of the plunger 60 is placed. Here, the axial center position Zm of the thin wall portion 22 is defined as a position of the axial center of the thin wall portion 22 in the axial direction of the central axis. Furthermore, in this state, the Q-point is also located on the distal end surface 62 side of an axial position Za of the A-point. Furthermore, in another embodiment, in which the chamfered portion, which is indicated by a dotted line in FIG. 3B, is formed in place of the rounded corner portion 63, the Q-point is on an opposite side of the axial position Za of the A-point, which is opposite from the distal end surface 62, but the Q-point is on the distal end surface 62 side of the axial center position Zm of the thin wall portion 22, which is centered in the axial direction. Thereby, as shown in FIGS. 7 to 10, a lap length (also referred to as an overlapping length) Llap between the main attracting portion 24 and the plunger 60 can be appropriately ensured, so that advantages of the present embodiment discussed later can be appropriately obtained.

Figure 20:
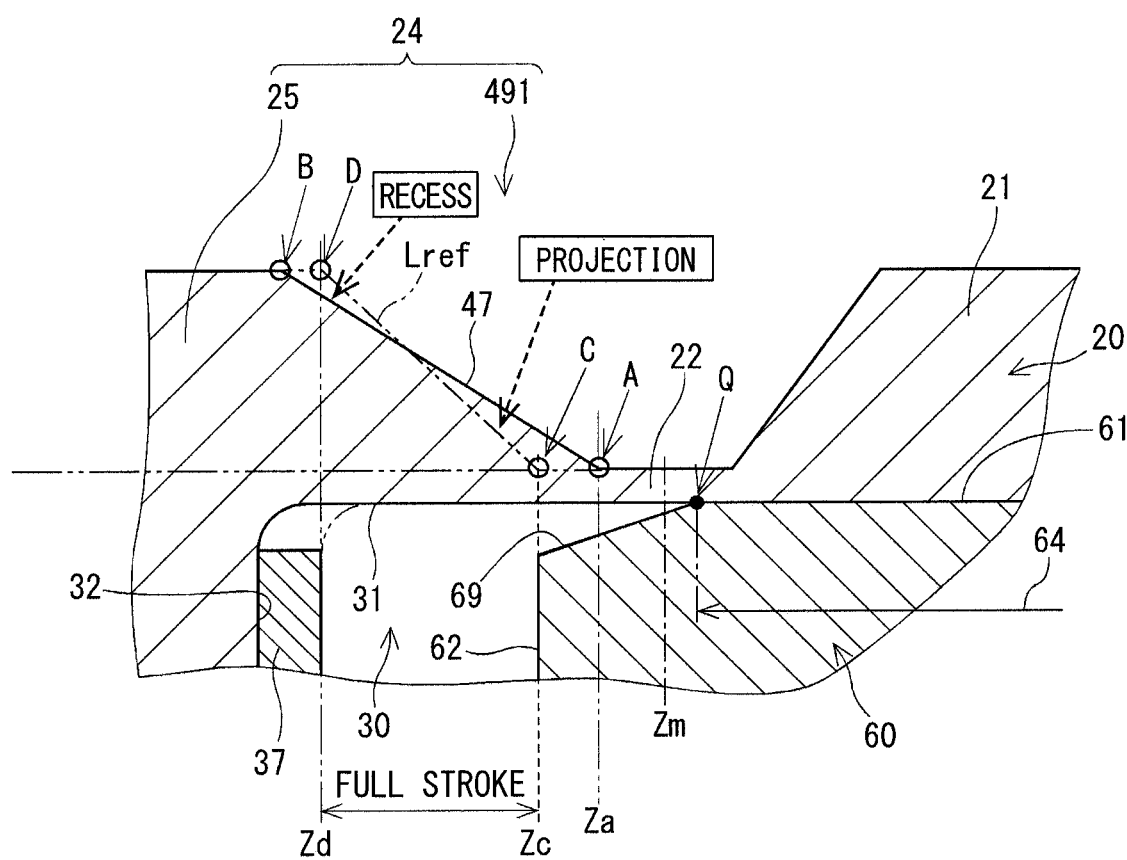
FIG. 20 is a partial enlarged view of a solenoid device according to a first related art.
Figure 21:
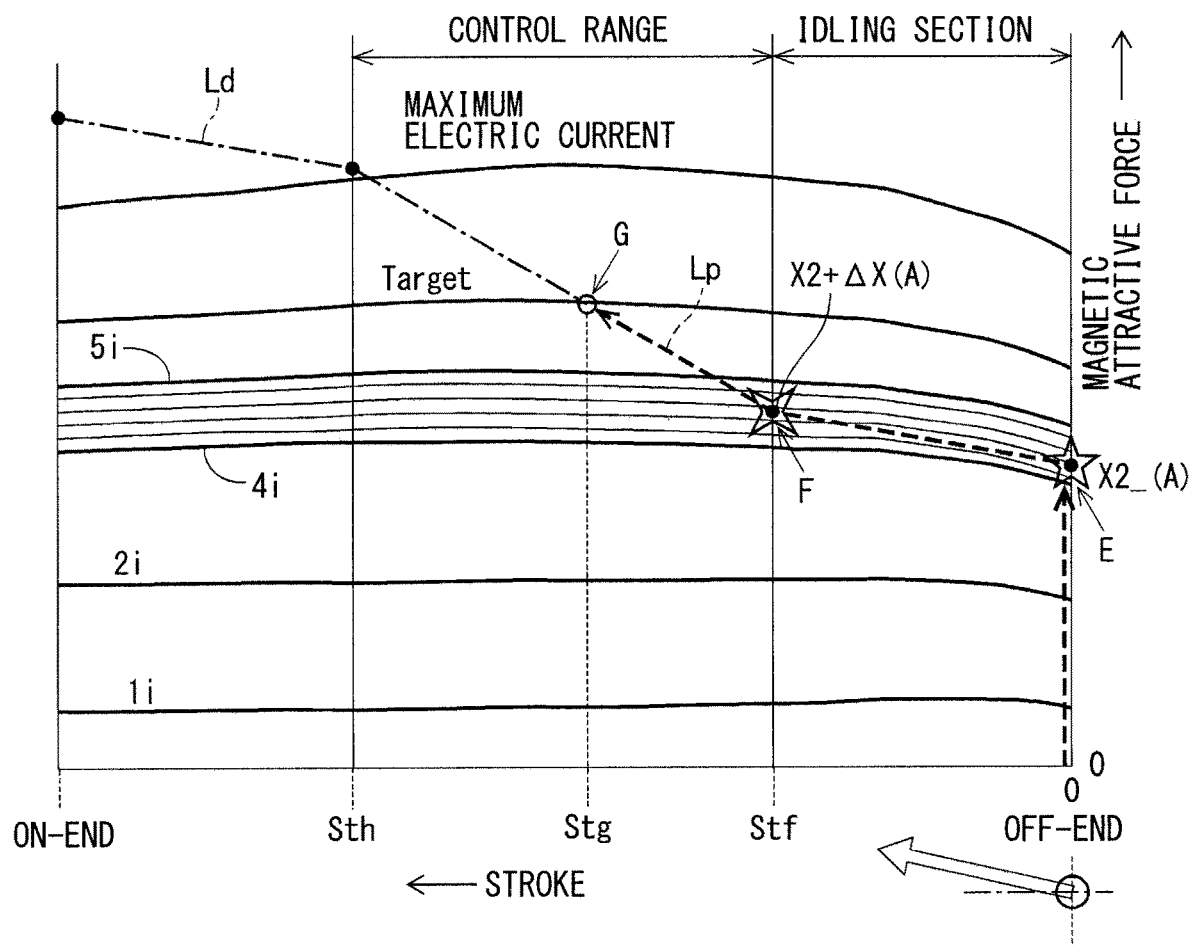
FIG. 21 is a diagram showing an attractive force characteristic of the first related art.

Next, the attractive force characteristic of the first embodiment, which satisfy the range condition and the angle condition discussed above, will be described with reference to the first related art, which is based on the disclosure of JP6094309B2 (corresponding to US2015/0179322A1). FIG. 20 shows a configuration of a diameter-increasing portion 491 of the first related art, and FIGS. 21 and 22 show an attractive force characteristic of this configuration.

Figure 2:
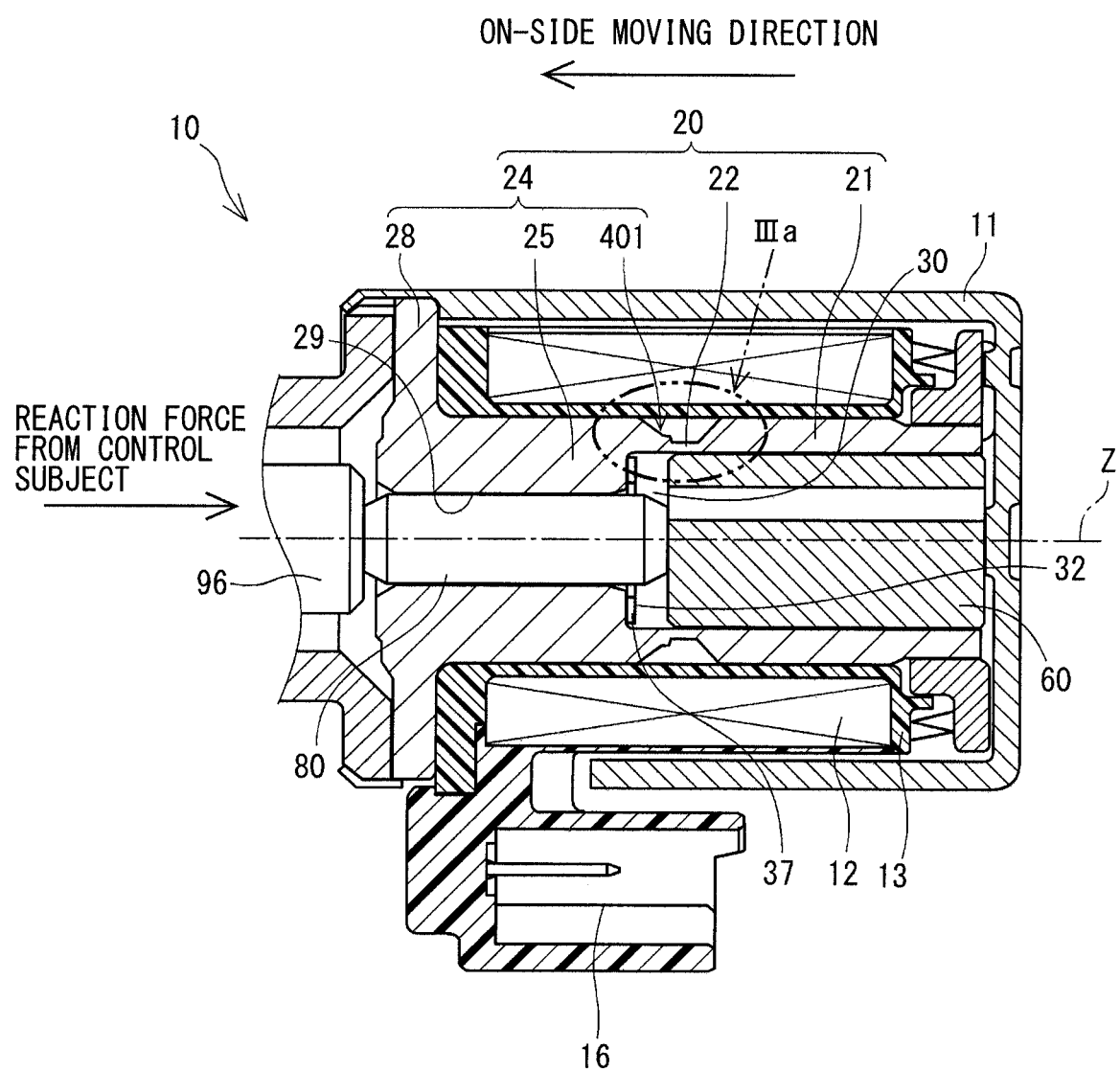
FIG. 2 is an axial cross-sectional view showing an overall structure of the solenoid device of the first embodiment.

A first reference point Q1 and a second reference point Q2, which form two opposite ends of a diameter-increasing reference line (also referred to as an increased diameter reference line) Lref shown in, for example, FIG. 2 of JP6094309B2 (corresponding to US2015/0179322A1) correspond to the C-point and the D-point shown in FIG. 20, which are defined in the first embodiment. The diameter-increasing portion of the first related art shown in FIG. 20 includes both a projecting part (see "projection" in FIG. 20), which projects from the diameter-increasing reference line Lref, and a recessing part (see "recess" in FIG. 20), which is recessed from the diameter-increasing reference line Lref.

As shown in FIG. 20, in a case where the B-point is located on the ON-side (the side opposite from the OFF-end in the axial direction) of the D-point, the shape of the diameter-increasing portion 491, which is formed by an angle segment 47 that is in a single taper form formed by connecting between the A-point and the B-point with a straight line, includes the projecting part, which radially outwardly projects from the diameter-increasing reference line Lref, and the recessing part, which is radially inwardly recessed from the diameter-increasing reference line Lref. Thus, the configuration of the diameter-increasing portion 491 serves as the previously proposed technique (the related art).

Furthermore, in FIG. 20, the straight terminal point (the Q-point), which is the intersection between the chamfered portion 69 and the straight portion 64 of the plunger 60, is axially placed on the opposite side of the axial center position Zm of the thin wall portion 22, which is opposite from the distal end surface 62 in the axial direction.

Therefore, the lap length Llap between the main attracting portion 24 and the plunger 60 cannot be sufficiently ensured.

FIG. 21 shows the magnetic attractive force characteristic relative to the stroke for each of applied electric current values. At the energizing time, the plunger 60 is moved from the OFF-end, which is indicated at the right side in FIG. 21, toward the ON-end, which is indicated at the left side in FIG. 21. A section, which is from the OFF-end to a stroke Stf, is an idling section that is from the time of starting the energization to the time of starting the control operation. A section, which is from the stroke Stf to a stroke sth, is a control range, in which the control operation for controlling the pressure or the flow rate is executed with the control valve 90. The electric current values are set as follows. Specifically, "i" denotes a given unit of electric current, and "2i" refers to an electric current that is two times larger than the electric current of "1i". Furthermore, "5i" refers to an electric current that is five times larger than the electric current of "1i". Characteristic lines between the line of "4i" and the line of 5i" are indicated at "0.2i" intervals in FIG. 21. In FIG. 21, "Target" indicates an example of a control target electric current and is set to be slightly lower than the maximum electric current.

Furthermore, a dot-dash line Ld indicates the urging load (e.g., the spring load and the oil pressure feedback force) received from the control subject. A dotted line indicates a moving path Lp of the plunger 60, along which the plunger 60 is moved while maintaining a balance relative to the urging load. Along the moving path Lp, a point, which is indicated by a five-pointed star at the OFF-end, is defined as an E-point, and a point, which is indicated by a four-pointed star at the position of the stroke Stf, is defined as an F-point. Furthermore, an intersection between the moving path Lp and the control target electric current is defined as a G-point. When the energization starts, the magnetic attractive force at the OFF-end is increased from 0 (zero) to a value at the E-point. Thereafter, in response to the movement of the plunger 60, the electric current is increased, and the magnetic attractive force is shifted in the order of the E-point, the F-point and the G-point. In the control range, the stroke of the plunger 60 at the time of reaching to the G-point is indicated by "Stg." At the G-point, the electric current reaches the control target electric current, and the generated magnetic attractive force is balanced with the urging load Ld.

Here, when the attention is paid to a change in the magnetic attractive force immediately after the start of the movement of the plunger from the OFF-end, it is understood that the attractive force is progressively increased in response to an increase in the stroke. Furthermore, when the attention is paid to a change in the electric current in the idling section, the electric current value at the E-point is defined by X2_(A), and the electric current value at the F-point, which is a point of transition from the idling section to the control range, is defined by X2+ΔX(A). Here, X2_(A) is about 4.4i, and X2+ΔX(A) is about 4.6i. An electric current difference ΔX between these values is only about 0.2i that is substantially equal to zero (0).

Figure 22A:
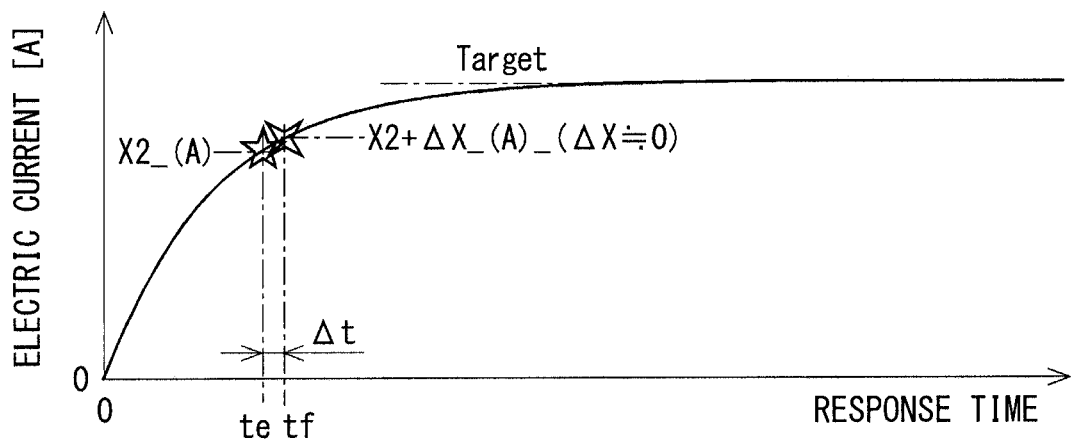
FIG. 22A is a diagram showing a response characteristic of an electric current according to the first related art.
Figure 22B:
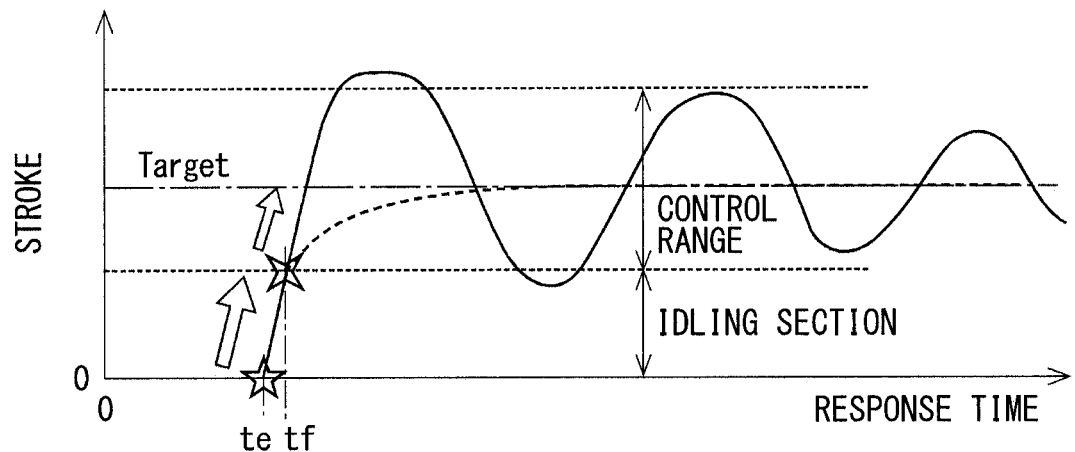
FIG. 22B is a diagram showing a response characteristic of a stroke according to the first related art.
Figure 22C:
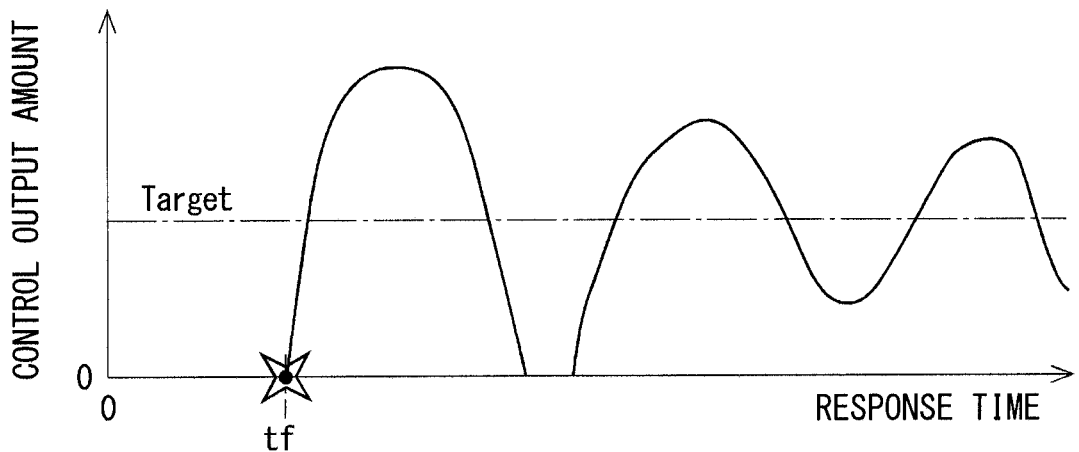
FIG. 22C is a diagram showing a response characteristic of a control output amount according to the first related art.

FIG. 22A indicates a response curve of the electric current relative to a response time from the time of starting the energization. FIG. 22B indicates a response curve of the stroke of the plunger 60 relative to the response time from the time of starting the energization. FIG. 22C indicates a response curve of a control output amount (e.g., the pressure, the flow rate) controlled by the control valve 90 relative to the response time from the time of starting the energization. The electric current increases while forming a first-order lag curve due to a feedback control operation of a drive circuit and converges to a control target electric current. A response time te and a response time tf respectively correspond to an E-point and an F-point in FIG. 21. At the response time te, the movement of the plunger 60 from the OFF-end starts. Then, at the response time tf, the control operation of the pressure or the flow rate starts. In the first related art, a time difference Δt between the response time te and the response time tf is extremely short in comparison to the first embodiment discussed later. As indicated by a block arrow of a solid line along the response curve of the stroke, the moving speed is high during a time period from the response time te to the response time tf, and the plunger 60 jumps out due to inertia upon entering the control range at the response time tf. Therefore, each of the stroke and the control output amount repeats overshooting and is attenuated in amplitude toward its target value Target.

A mechanism of generating the inconvenience, such as the overshooting, due to the characteristic of the first related art is assumed to be as follows. The first related art shows the characteristic of that the attractive force progressively increases from the OFF-end to a center section of the stroke, i.e., progressively increases from the OFF-end to a control start section of the control valve 90. With the progressively increasing attractive force characteristic described above, the attractive force at the OFF-end is small at the time of applying a step current of ON to the solenoid, e.g., at the time of applying a response current that shows a first order lag characteristic due to an inductance or a feedback control operation of a drive circuit. Therefore, the time of starting the movement of the plunger from the OFF-end by overcoming the urging load of the spring is delayed. Since the time difference between the time of starting the movement of the plunger from the OFF-end to the time of starting the control operation of the fluid becomes small, the moving speed of the movable member having the weight (e.g., the plunger, the valve) at the time of starting the control operation of the fluid, i.e., the time of starting a change in the output characteristic becomes very high. Therefore, due to the high inertial force, which is applied to the movable member, the pressure or the flow rate, which is supposed to be stably controlled, does not immediately converge to the predetermined target value thereof. Thus, there is created the inconvenience, such as the generation of overshooting and/or chattering that respectively serve as the transient characteristic, or the inconvenience of forming the start point of continuous pulsations.

Figure 4:
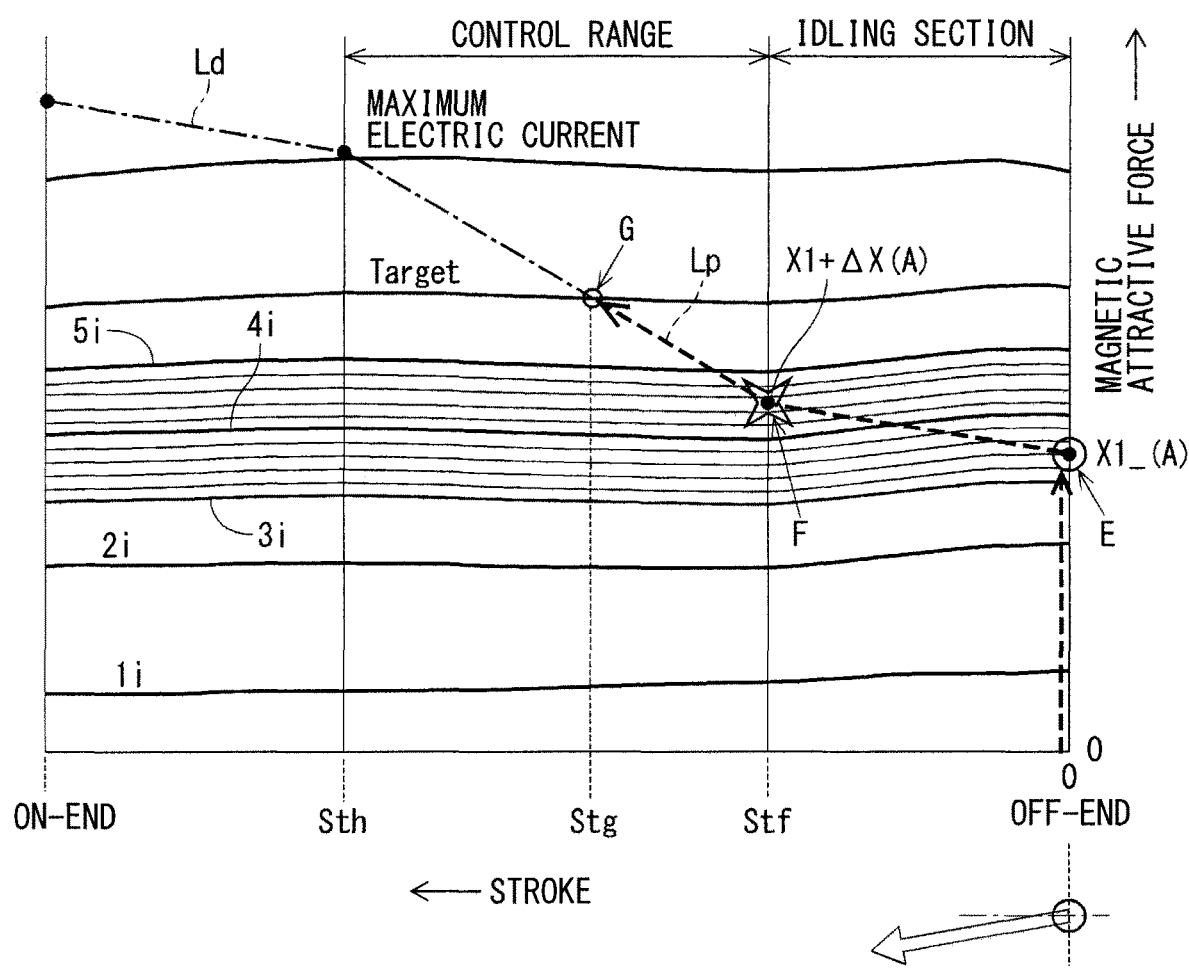
FIG. 4 is a diagram showing an attractive force characteristic of the first embodiment.

Next, the attractive force characteristic of the first embodiment will be described with reference to FIGS. 4 and 5. The contents of FIGS. 4 and 5 are similar to those of FIGS. 21 and 22. In FIG. 4, similar to FIG. 21, when the energization starts, the magnetic attractive force is shifted from 0 along the moving path Lp through the E-point, the F-point and the G-point. Here, when the attention is paid to a change in the magnetic attractive force immediately after the start of the movement of the plunger from the OFF-end, it is understood that the high attractive force is obtained at the OFF-end according to the first embodiment, and thereby the attractive force is progressively reduced in response to an increase in the stroke. Furthermore, in view of a change in the electric current in the idling section, the electric current value at the E-point is defined as X1_(A), and the electric current value at the F-point, which is the point of transition from the idling section to the control range, is defined as X1+ΔX(A). Here, X1_(A) is about 3.4i, and X1+ΔX(A) is about 4.6. Furthermore, the electric current difference ΔX is 1.2i that is larger in comparison to the first related art.

Figure 5A:
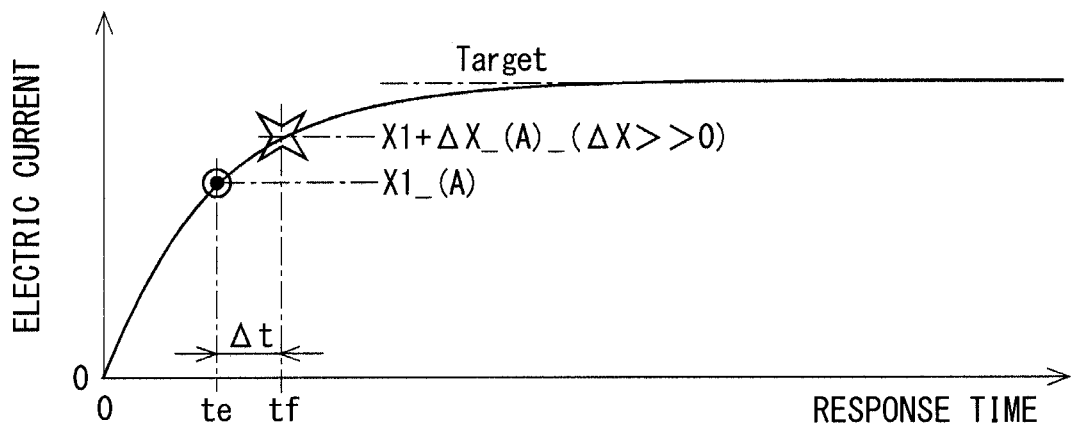
FIG. 5A is a diagram showing a response characteristic of an electric current according to the first embodiment.
Figure 5B:
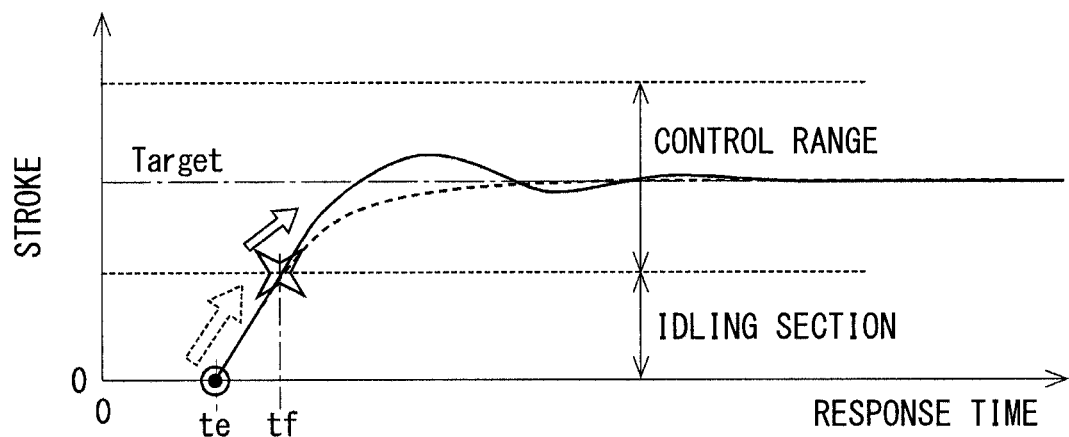
FIG. 5B is a diagram showing a response characteristic of a stroke according to the first embodiment.
Figure 5C:
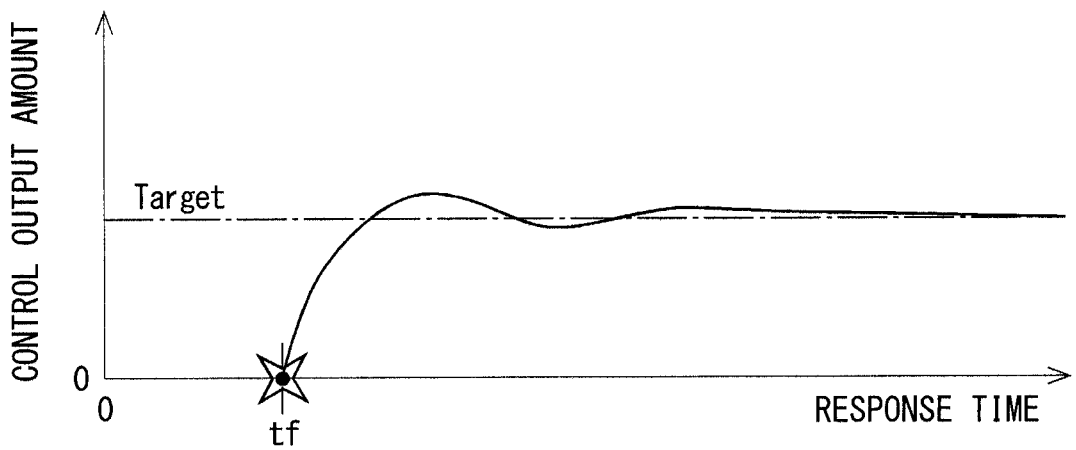
FIG. 5C is a diagram showing a response characteristic of a control output amount according to the first embodiment.

FIG. 5A indicates a response curve of the electric current relative to the response time from the time of starting the energization. FIG. 5B indicates a response curve of the stroke of the plunger 60 relative to the response time from the time of starting the energization. FIG. 5C indicates a response curve of the control output amount relative to the response time from the time of starting the energization. In the first embodiment, the time difference Δt between the response time te and the response time tf according to the first embodiment is increased because the electric current difference ΔX at the electric current curve is larger in comparison to the first related art. Specifically, the operation can start at the early time, at which the attractive force at the OFF-end is high, and the electric current is low. Thus, the response time te, which is the timing of starting the operation, is set earlier, and thereby the time difference Δt is increased. As a result, as indicated by a block arrow of a dotted line along the response curve of the stroke, the moving speed is reduced during the time period from the response time te to the response time tf. Thus, the inertia of the plunger 60 is reduced at the time of entering the control range at the response time tf, and thereby the jumping out of the plunger 60 is limited. Therefore, the amount of overshooting of the stroke and the amount of overshooting of the control output amount are reduced, and thereby the stable control operation can be performed.

Figure 23:
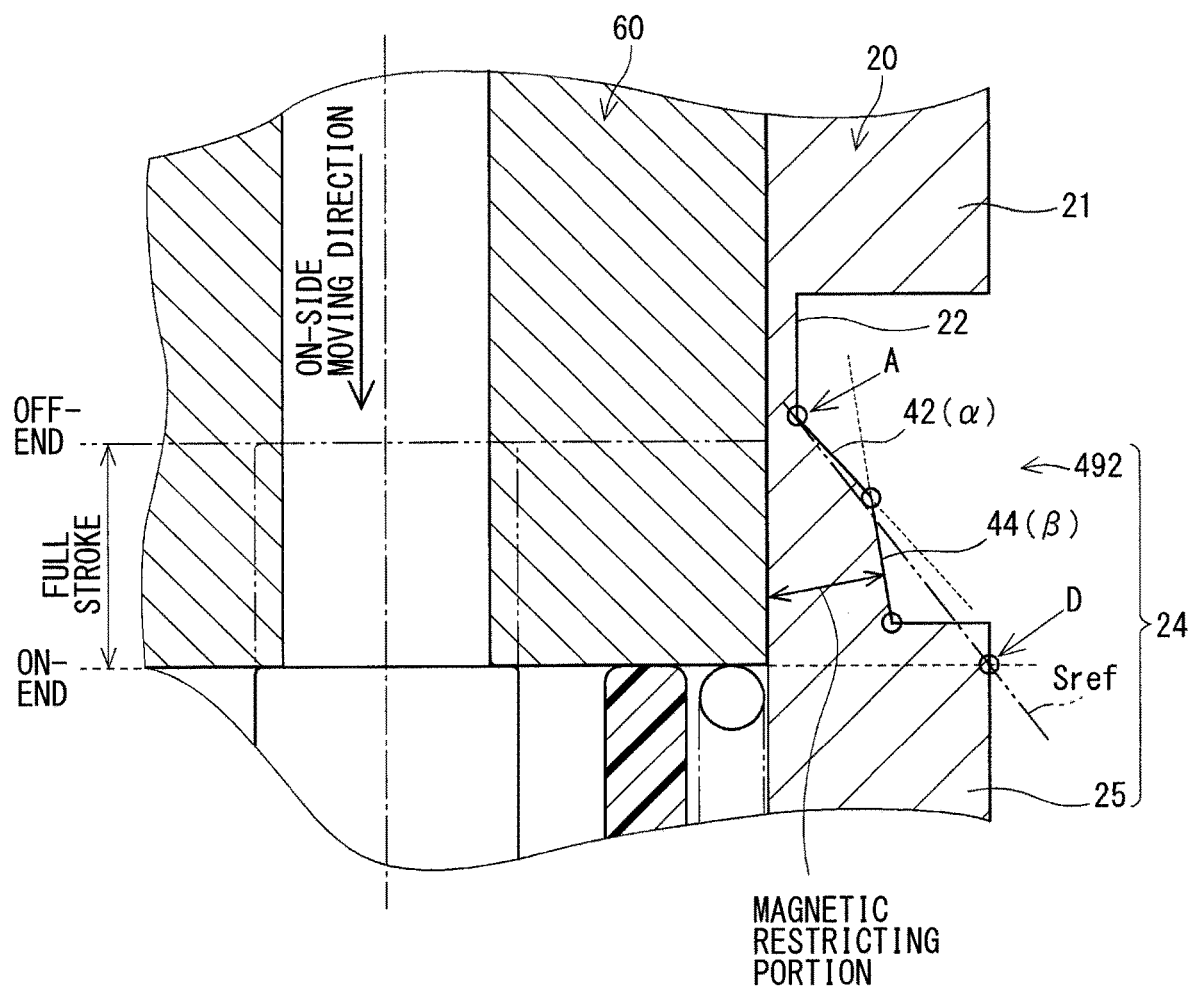
FIG. 23 is a partial enlarged view of a solenoid device according to a second related art.
Figure 24:
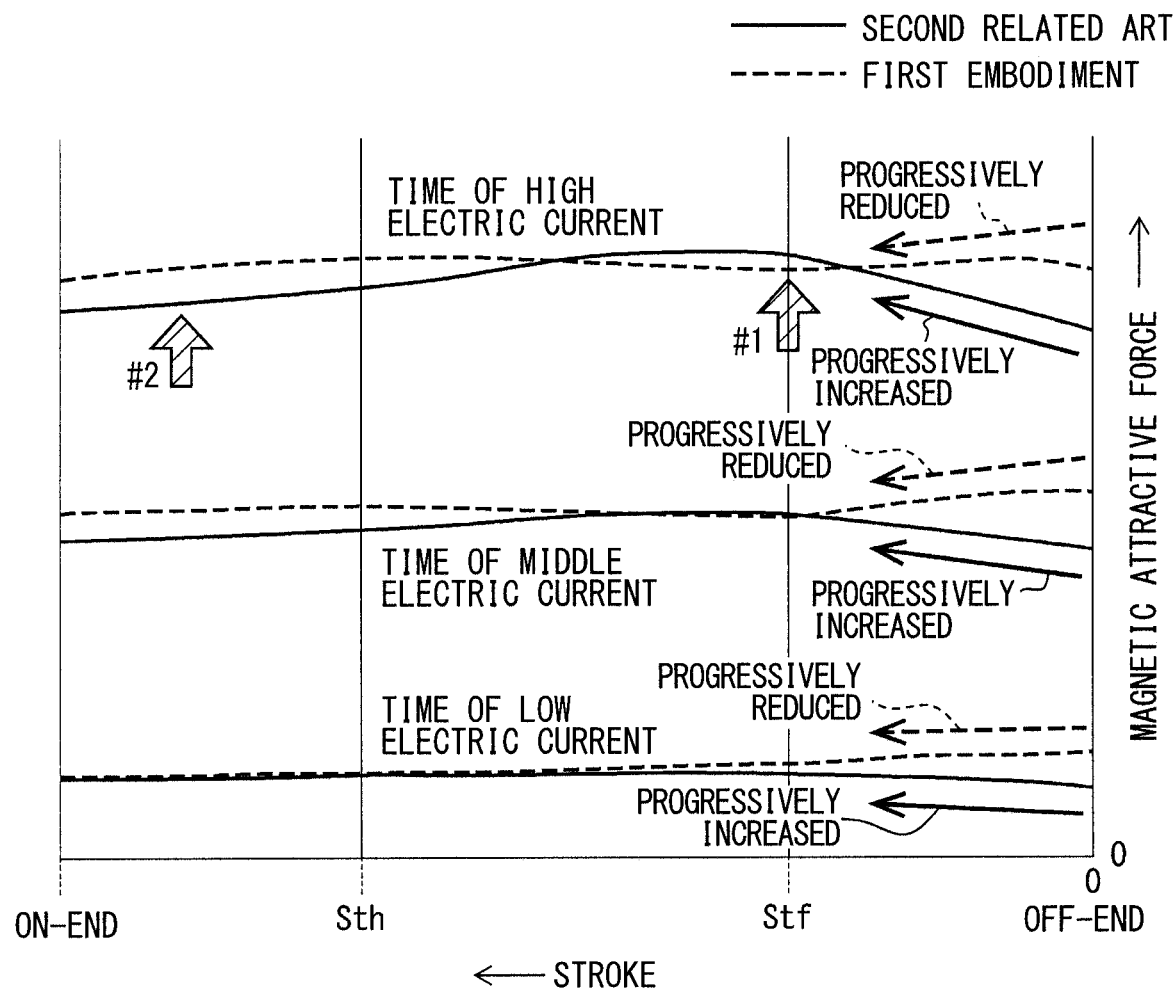
FIG. 24 is a diagram showing an attractive force characteristic of the second related art.

Next, there will be described a comparison between the present embodiment and the second related art, which is based on the disclosure of JP3757817B2 (corresponding to US2002/0175569A1). FIG. 23 shows a configuration of a diameter-increasing portion 492 of a core main attracting portion in a state where the plunger is moved to the ON-end relative to FIG. 2 of JP3757817B2 (corresponding to US2002/0175569A1). FIG. 24 shows the attractive force characteristic of this configuration.

The diameter-increasing portion 492 of the second related art includes the first angle segment 42 and the second angle segment 44 of the first embodiment but does not include the third angle segment 46 of the first embodiment. The second angle segment 44 is configured such that the second angle β of the second angle segment 44 is smaller than the first angle α of the first angle segment 42, and the gradient angle is reduced in the ON-side moving direction of the plunger. Furthermore, a taper-start point at the radially outer surface of the thin wall portion 22 is defined as the A-point, and an intersection between the radially outer surface of the thick wall portion 25 and the imaginary extension line of the distal end surface 62 of the plunger 60 held at the ON-end is defined as the D-point. Additionally, an imaginary conical surface, which is obtained by rotating the straight line connecting between the A-point and the D-point about the central axis, is defined as the reference conical surface Sref. The second angle segment 44 is in a form of a recess that is radially inwardly recessed from the reference conical surface Sref.

FIG. 24 shows the attractive force characteristic of the second related art and the attractive force characteristic of the first embodiment. The attractive force characteristic is indicated only for three patterns, specifically a time of low electric current, a time of middle electric current, and a time of high electric current. In comparison to the characteristic of the first related art, which implements the single taper form shown in FIG. 20, the attractive force characteristic of the second related art shows an increase in the magnetic attractive force at the OFF-end and the center section of the stroke, as indicated by an arrow #1. Furthermore, as indicated by an arrow #2, a decrease in the magnetic attractive force is limited from the ON-end side of the control range to the ON-end. Therefore, there is implemented an advantage of generating a relatively flat characteristic relative to the stroke.

However, the slope of the attractive force relative to the increase in the stroke at the OFF-end side region differs between the first embodiment and the second related art as follows. That is, the attractive force is progressively decreased in response to the increase in the stroke in the first embodiment, and the attractive force is progressively increased in response to the increase in the stroke in the second related art like in the first related art. Therefore, even in the case of the second related art, it is not possible to provide the advantage of limiting the inconvenience, such as the overshooting or the pulsation shown in FIG. 24.

The configuration of the second related art is intended to increase the first angle α of the first angle segment 42 and thereby to increase the attractive force at the OFF-end side. However, since the second angle segment 44 is in the form of recess that is radially inwardly recessed from the reference conical surface Sref, a magnetic flux restricting portion (or a magnetic resistance portion) is present. Therefore, the amount of the magnetic flux, which is supplied to the first angle segment 42, is reduced, and thereby the effect of increasing the magnetic attractive force at the OFF-end is relatively small. Thus, it is not possible to have the attractive force characteristic of the first embodiment where the attractive force is progressively decreased in response to the increase in the stroke.

Figure 6:
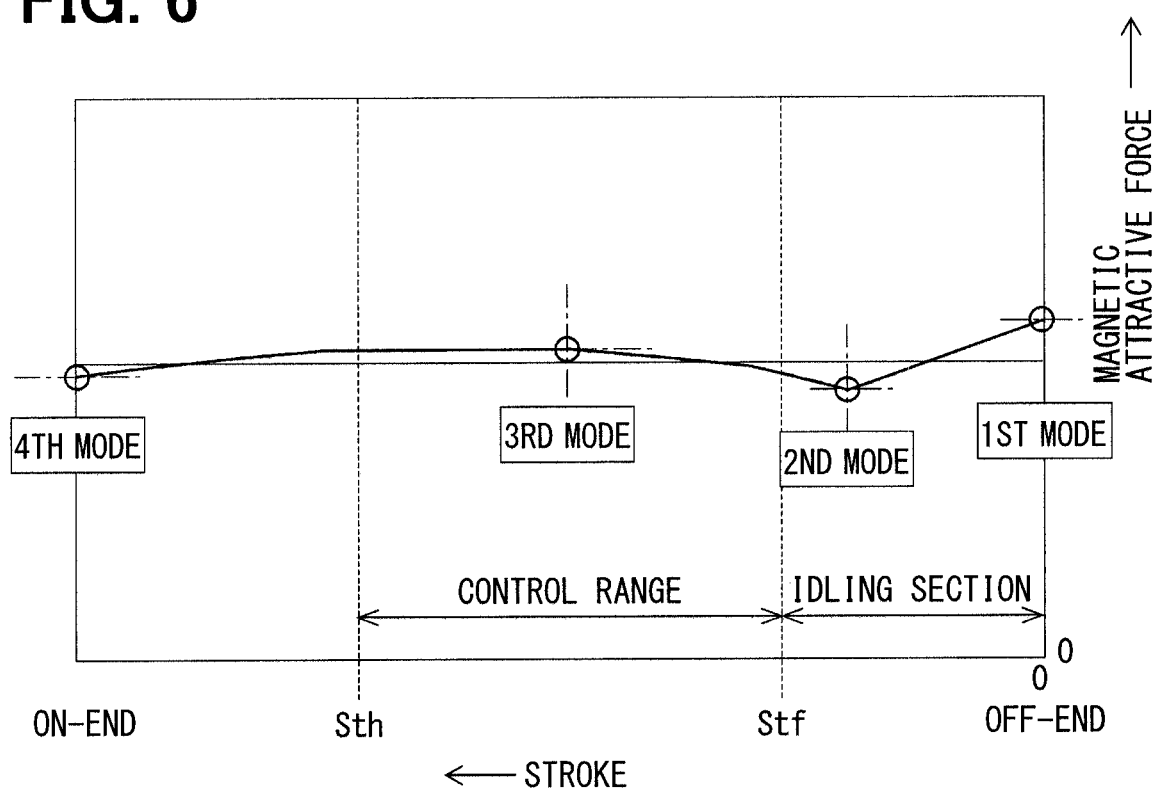
FIG. 6 is an image diagram showing an attractive force characteristic of the first embodiment.

Next, a mechanism of generating the attractive force according to the first embodiment will be described with reference to FIGS. 6 to 10. FIG. 6 shows a change of the attractive force characteristic relative to the stroke. FIGS. 7 to 10 show effects of the magnetic flux energy Eφ and the attraction force vector Fs in each of four modes, i.e., first to fourth modes from the OFF-end to the ON-end. In FIGS. 7 to 10, Fs_z indicates a component of the attraction force vector Fs in the direction of the center axis Z. A lap length Llap between the main attracting portion 24 of the core 20 and the plunger 60 corresponds to an axial distance between the A-point and the Q-point.

Figure 7:
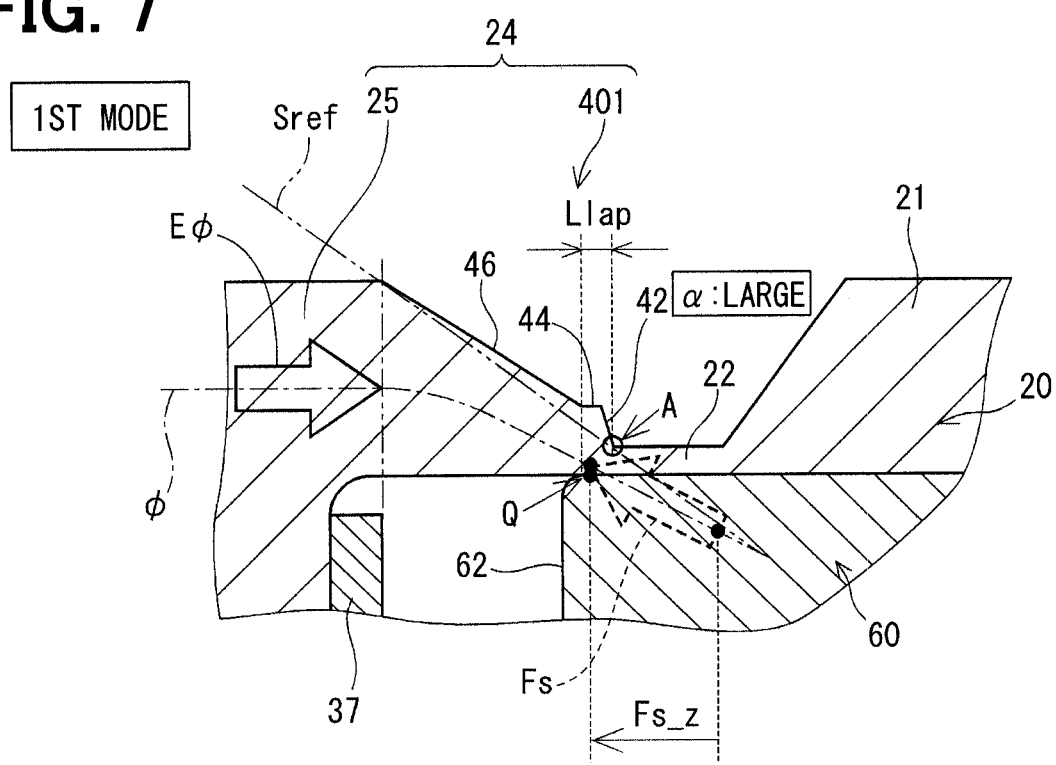
FIG. 7 is a partial enlarged view showing an operation under a first mode.

FIG. 7 shows the first mode at the position of the OFF-end of the stroke. The magnetic flux energy Eφ is generated along the magnetic flux line φ, which extends along a wall thickness center of the diameter-increasing portion 401 from the thick wall portion 25. Since the lap length Llap between the core 20 and the plunger 60 is short, the magnetic flux energy Eφ is relatively small. However, the first angle α is relatively large, and a volume of the first angle segment 42 is large. Therefore, a gradient angle of the attractive force vector Fs is limited to a relatively small angle. Thus, the axial component Fs_z of the attractive force vector Fs becomes large, and thereby the large attractive force, which is directed in the ON-side moving direction, is obtained.

Figure 8:
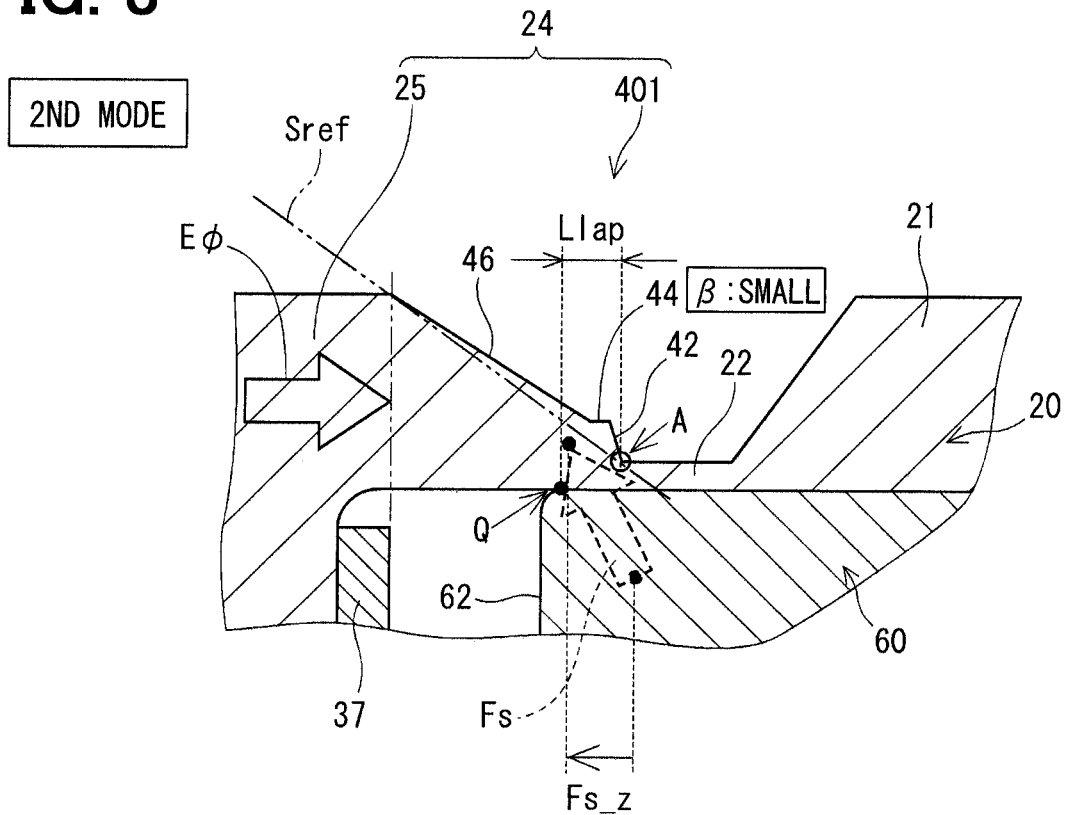
FIG. 8 is a partial enlarged view showing an operation under a second mode.

FIG. 8 shows the second mode at the idling section, which is from the OFF-end to the fluid control range. In the second mode, the stroke and the lap length Llap are increased in comparison to the first mode. However, since the second angle β of the second angle segment 44 is small, the magnetic flux energy Eφ is not increased due to energy saving effect. Furthermore, the gradient angle of the attractive force vector Fs is increased, i.e., the attractive force vector Fs rises toward the radially outer side, so that the axial component Fs_z is reduced in comparison to the first mode. Therefore, the magnetic attractive force is progressively reduced from the first mode.

Figure 9:
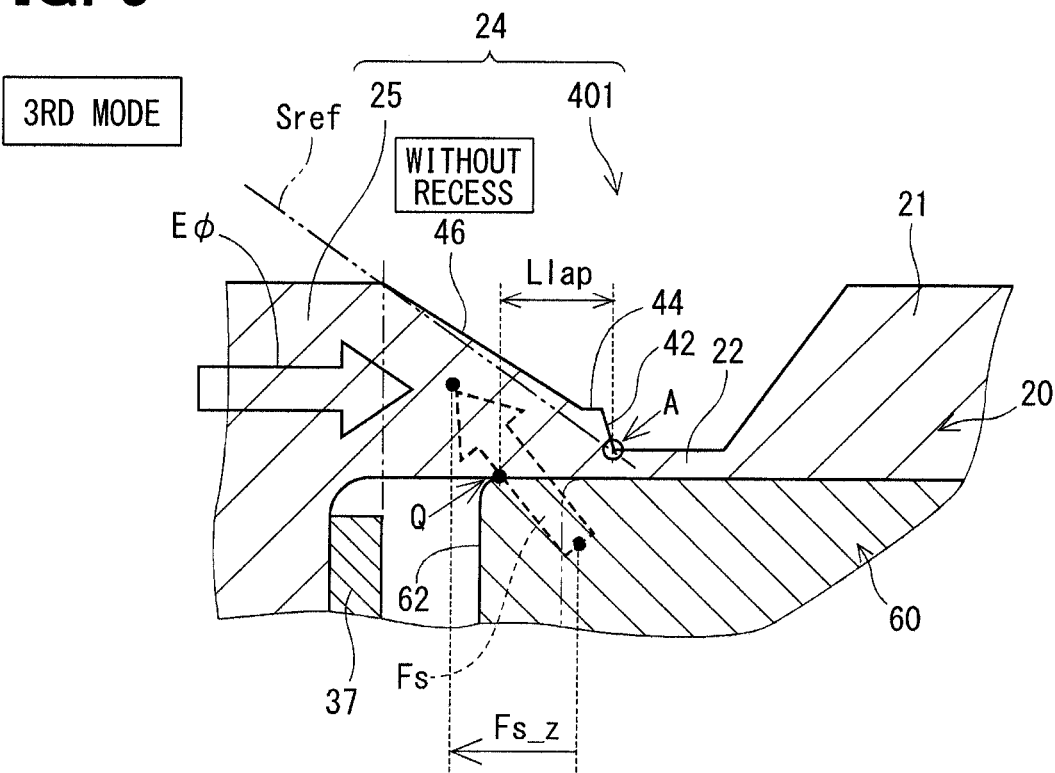
FIG. 9 is a partial enlarged view showing an operation under a third mode.
Figure 10:
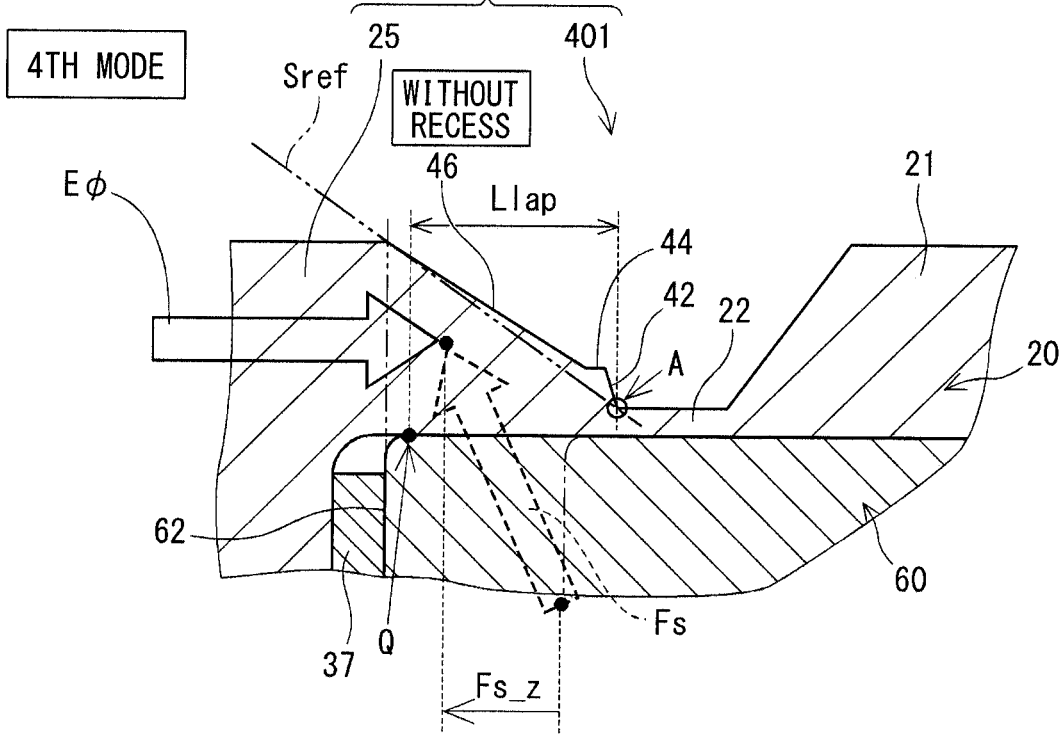
FIG. 10 is a partial enlarged view showing an operation under a fourth mode.

FIG. 9 shows the third mode in the control range, in which the pressure or the flow rate of the fluid is controlled. FIG. 10 shows the fourth mode at the ON-end position of the stroke. At the third and fourth modes, the lap length Llap between the core 20 and the plunger 60 is increased in response to the increase of the stroke. Furthermore, the third angle segment 46 does not have the recessed portion that is recessed from the reference conical surface Sref and serves as the magnetic flux restricting portion. Therefore, the magnetic flux energy Eφ is appropriately increased, and a relatively large value of the axial component Fs_z of the attractive force vector is obtained. Furthermore, since the third angle segment 46 extends at a generally constant gradient angle all the way to the thick wall portion 25 around the ON-end, the amount of reduction in the magnetic attractive force in the range, which is from the stroke center section to the ON-end, is relatively small.

As discussed above, in the solenoid device 10 of the first embodiment, the first angle segment 42, the second angle segment 44 and the third angle segment 46, which form the diameter-increasing portion 40, are configured to satisfy the range condition and the angle condition discussed above. Specifically, the entire range of the diameter-increasing portion 401 radially outwardly projects from the reference conical surface Sref, and the first angle α at the taper-start point side is larger than the reference angle and is the largest among the three angles, and the third angle γ at the taper-end point side is the second largest, and the intermediate second angle β is the smallest. With this construction, in the first embodiment, it is possible to appropriately limit the generation of, for example, the overshooting without deteriorating the attractive force in comparison to the first and second related arts.

Next, second to tenth embodiments will be described with reference to FIGS. 11 to 19 as variations of the configuration of the diameter-increasing portion. The diameter-increasing portion of each of the following embodiments is configured to satisfy the range condition and the angle condition discussed above.

Second Embodiment

Figure 11:
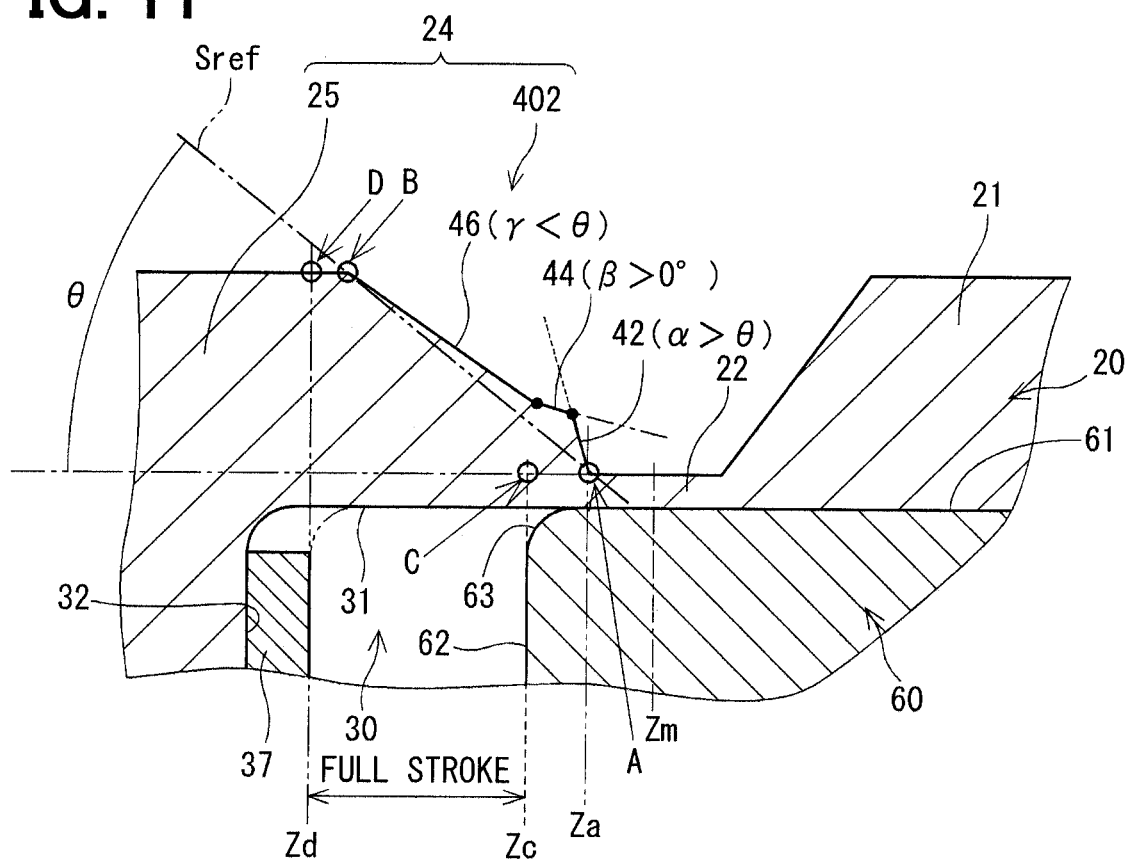
FIG. 11 is a partial enlarged view of a solenoid device according to a second embodiment.

The diameter-increasing portion 402 of the second embodiment shown in FIG. 11 is configured such that in comparison to the diameter-increasing portion 401 of the first embodiment, the second angle β of the second angle segment 44 is a positive value, and the outer diameter of the second angle segment 44 is slightly increased in the ON-side moving direction. Furthermore, the B-point is slightly offset from the D-point toward the OFF-end. The diameter-increasing portion 402 of the second embodiment is formed by slightly modifying the configuration of the diameter-increasing portion 401 of the first embodiment and achieves the advantages that are similar to those of the first embodiment.

Third Embodiment

Figure 12:
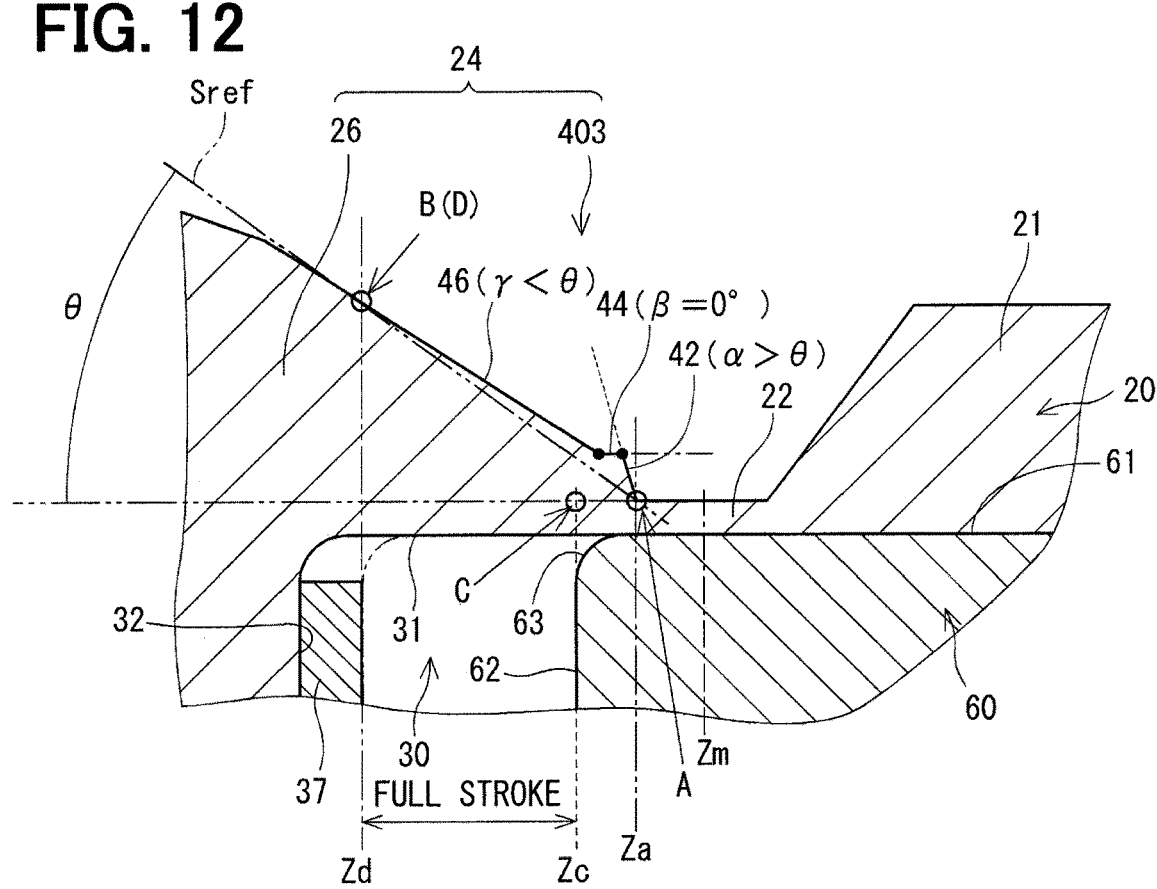
FIG. 12 is a partial enlarged view of a solenoid device according to a third embodiment.

In a third embodiment shown in FIG. 12, the main attracting portion 24 of the core 20 is configured such that the thick wall portion 26 is not parallel to the central axis Z, and the third angle segment 46 is further extended in the ON-side moving direction beyond the position of the distal end surface 62 of the plunger 60 held at the ON-end. In the axial cross section of the diameter-increasing portion 403 of the third embodiment, the B-point, which is the taper-end point, is defined as an intersection between the third angle segment 46 and the imaginary extension line of the distal end surface 62 of the plunger 60 held at the ON-end. Specifically, the B-point coincides with the D-point. Even in the above-described configuration where the thick wall portion 26 is not parallel to the central axis Z, the technical idea of the present embodiment can be commonly applied by replacing the definition of the B-point.

Fourth Embodiment

Figure 13:
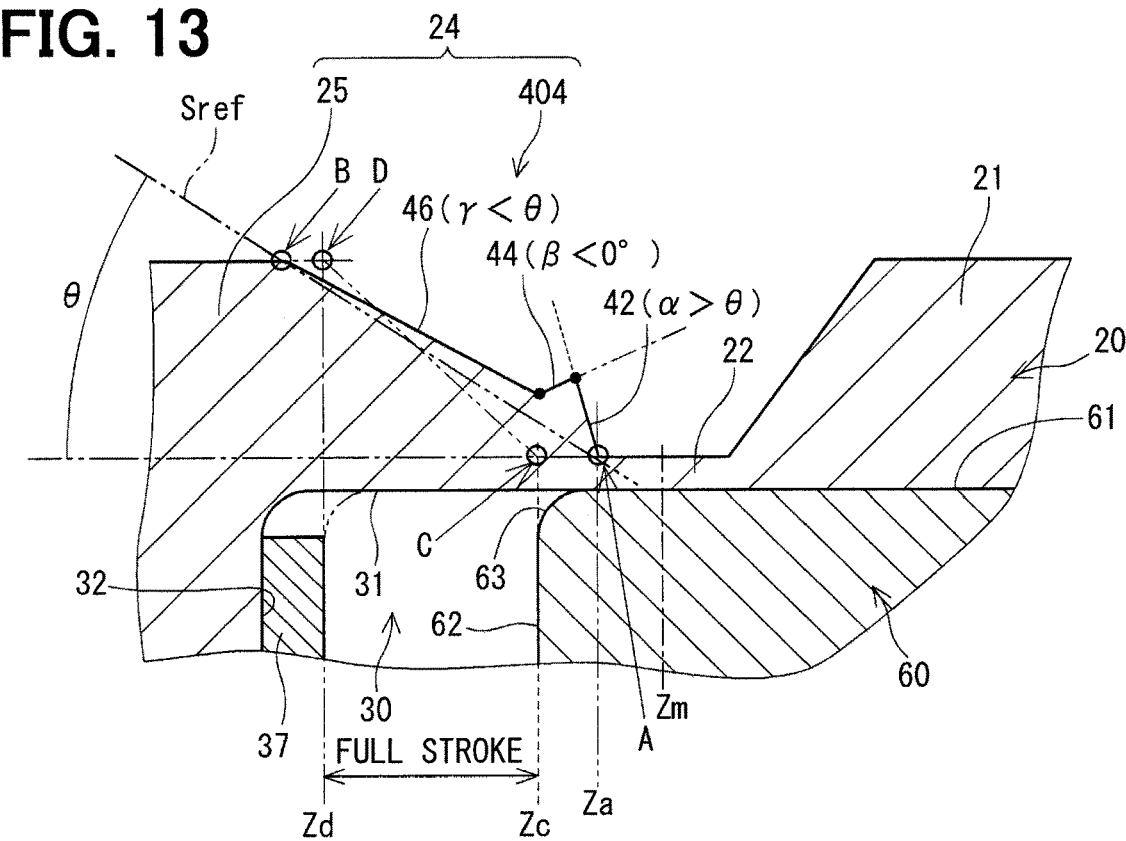
FIG. 13 is a partial enlarged view of a solenoid device according to a fourth embodiment.

The diameter-increasing portion 404 of the fourth embodiment shown in FIG. 13 is configured such that in comparison to the diameter-increasing portion 401 of the first embodiment, the second angle β of the second angle segment 44 is a negative value, and the outer diameter of the second angle segment 44 is decreased in the ON-side moving direction. Furthermore, the B-point is slightly offset from the D-point toward the ON-side. By setting the second angle β to the negative value, the effect of limiting the increase in the magnetic flux energy in the idling section becomes more prominent.

Fifth Embodiment

Figure 14:
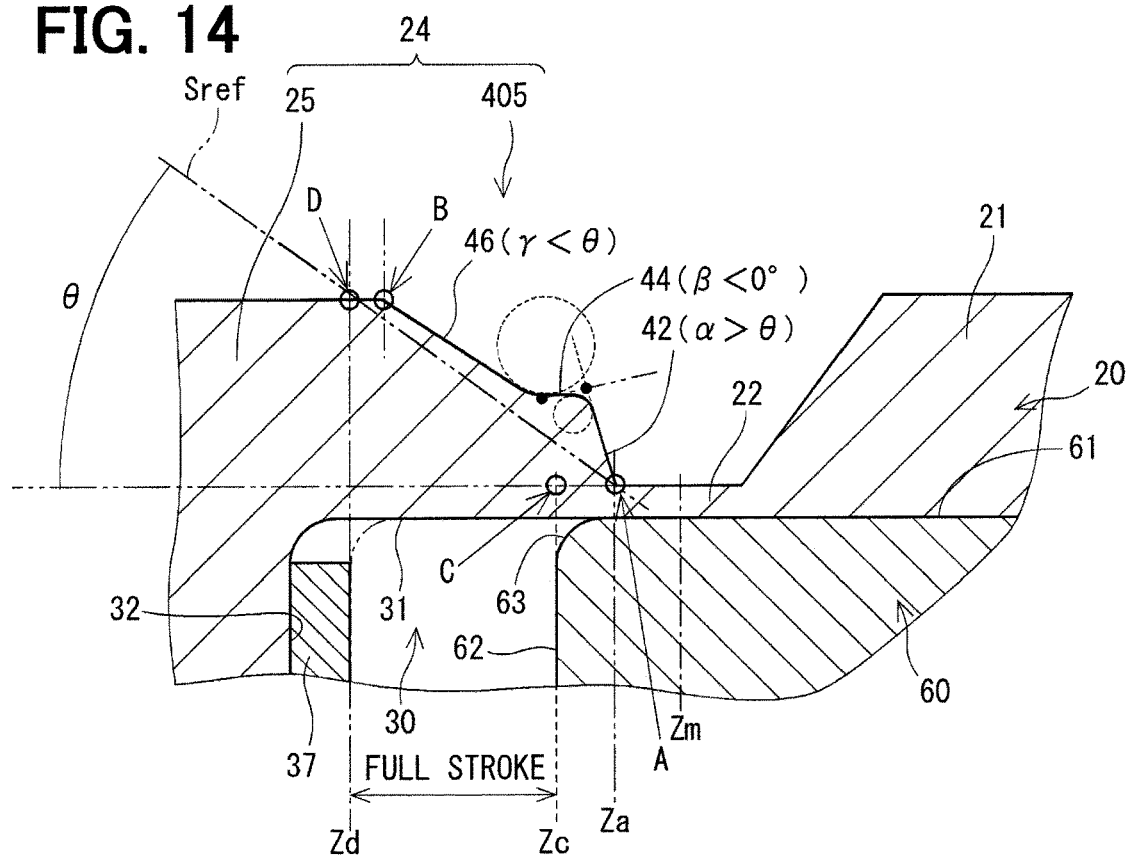
FIG. 14 is a partial enlarged view of a solenoid device according to a fifth embodiment.

In the diameter-increasing portion 405 of the fifth embodiment shown in FIG. 14, a boundary between the first angle segment 42 and the second angle segment 44 and a boundary between the second angle segment 44 and the third angle segment 46 are connected (or defined) by a curved line in the axial cross section. In the example shown in FIG. 14, each boundary is connected (or defined) by an arc. Specifically, as indicated by an imaginary line (dotted line), the boundary between the first angle segment 42 and the second angle segment 44 is connected (or defined) by the corresponding arc that contacts the first angle segment 42 and the second angle segment 44, and the boundary between the second angle segment 44 and the third angle segment 46 is connected (or defined) by the corresponding arc that contacts the second angle segment 44 and the third angle segment 46. By eliminating an edge of the boundary, the stress concentration is reduced while the required strength is ensured, and the attractive force characteristic changes smoothly. Furthermore, the boundary between the second angle segment 44 and the third angle segment 46, which forms an inner corner (concave corner), is shaped into an arcuate form that corresponds to a nose R of an ordinary tool at a cutting process.

In the example shown in FIG. 14, the second angle β of the second angle segment 44 is the negative value, and the B-point is slightly offset from the D-point toward the OFF-end. However, "the configuration of the boundary connected (or defined) by the curved line" of the fifth embodiment may be applied to any of the diameter-increasing portions regardless of the value of each of the angles or the location of each of the points. Furthermore, at least one of the boundaries of the angle segments may have the configuration of the boundary connected (or defined) by the curved line.

Sixth Embodiment

Figure 15:
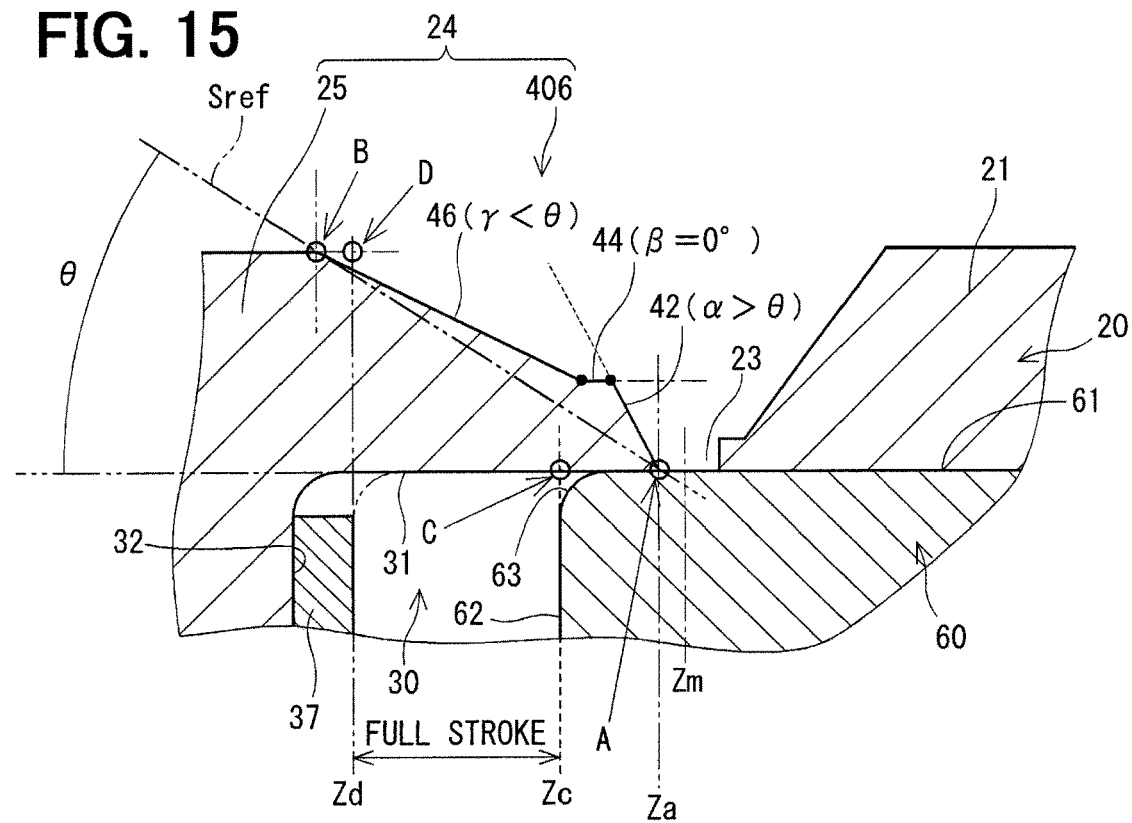
FIG. 15 is a partial enlarged view of a solenoid device according to a sixth embodiment.

In the sixth embodiment shown in FIG. 15, in place of the thin wall portion 22 of the above embodiments, the core 20 includes an interrupting portion 23 that interrupts between the main attracting portion 24 and the plunger support portion 21. In the sixth embodiment, the interrupting portion 23 is in a form of an air gap that separates between the main attracting portion 24 and the plunger support portion 21. In the axial cross section of the diameter-increasing portion 406 of the sixth embodiment, the A-point, which is the taper-start point, is defined as an intersection between the inner peripheral surface 31 of the plunger-receiving hole 30 and the first angle segment 42. The reference conical surface Sref is defined based on the straight line that connects between the A-point and the B-point in the same manner as that of the above embodiments. In the example of FIG. 15, the first angle segment 42 defines the first angle α at the A-point. Furthermore, the C-point is defined as an intersection between the inner peripheral surface 31 of the plunger-receiving hole 30 and the imaginary extension line of the distal end surface 62 of the plunger 60 held at the OFF-end. Additionally, the axial center position Zm of the interrupting portion 23 is defined as a position of the axial center of the interrupting portion 23 in the axial direction of the central axis Z. Even in the above-described configuration where the core 20 includes the interrupting portion 23, the technical idea of the present embodiment can be commonly applied by replacing the definition of the A-point.

Seventh Embodiment

Figure 16:
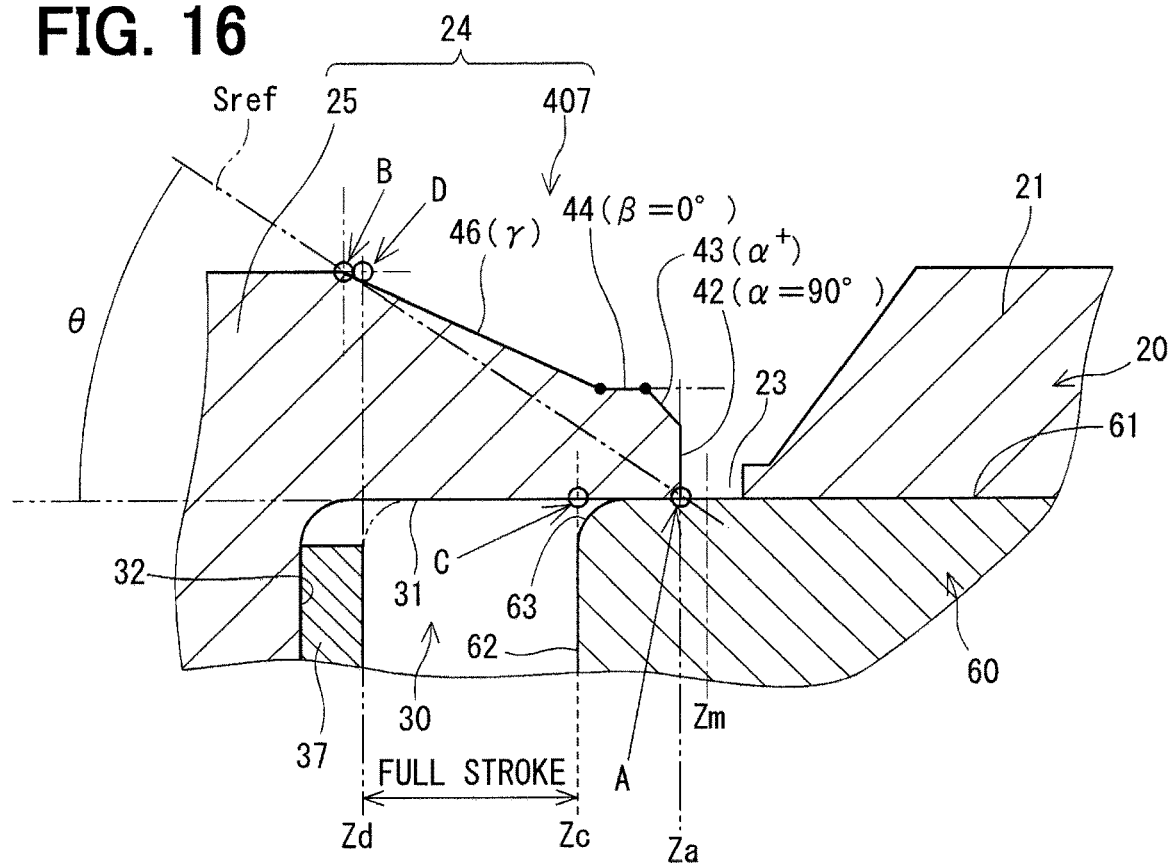
FIG. 16 is a partial enlarged view of a solenoid device according to a seventh embodiment.

In a seventh embodiment shown in FIG. 16, the core 20 includes the interrupting portion 23 like in the sixth embodiment. In the diameter-increasing portion 407 of the seventh embodiment, the first angle α of the first angle segment 42 is set to be 90 degrees. Specifically, the end surface of the main attracting portion 24, which faces to the interrupting portion 23, is perpendicular to the central axis Z. Furthermore, in the example of FIG. 16, a quasi-first angle segment 43, which has a quasi-first angle $\alpha^+$ that corresponds to an angle of a chamfer (or a bevel), is formed between the first angle segment 42, which has the first angle α of 90 degrees, and the second angle segment 44, which has the second angle β of zero (0) degrees. Alternatively, the first angle α may be set to be larger than 90 degrees. As described above, the diameter-increasing portion 407 may include the fourth angle segment in addition to the first angle segment 42, the second angle segment 44 and the third angle segment 46. Even in such a case, the configuration of the diameter-increasing portion 407 is defined to satisfy the range condition and the angle condition. Here, it should be noted that the angle condition is not applied to the quasi-first angle $\alpha^+$.

Eighth and Ninth Embodiment

Figure 17:
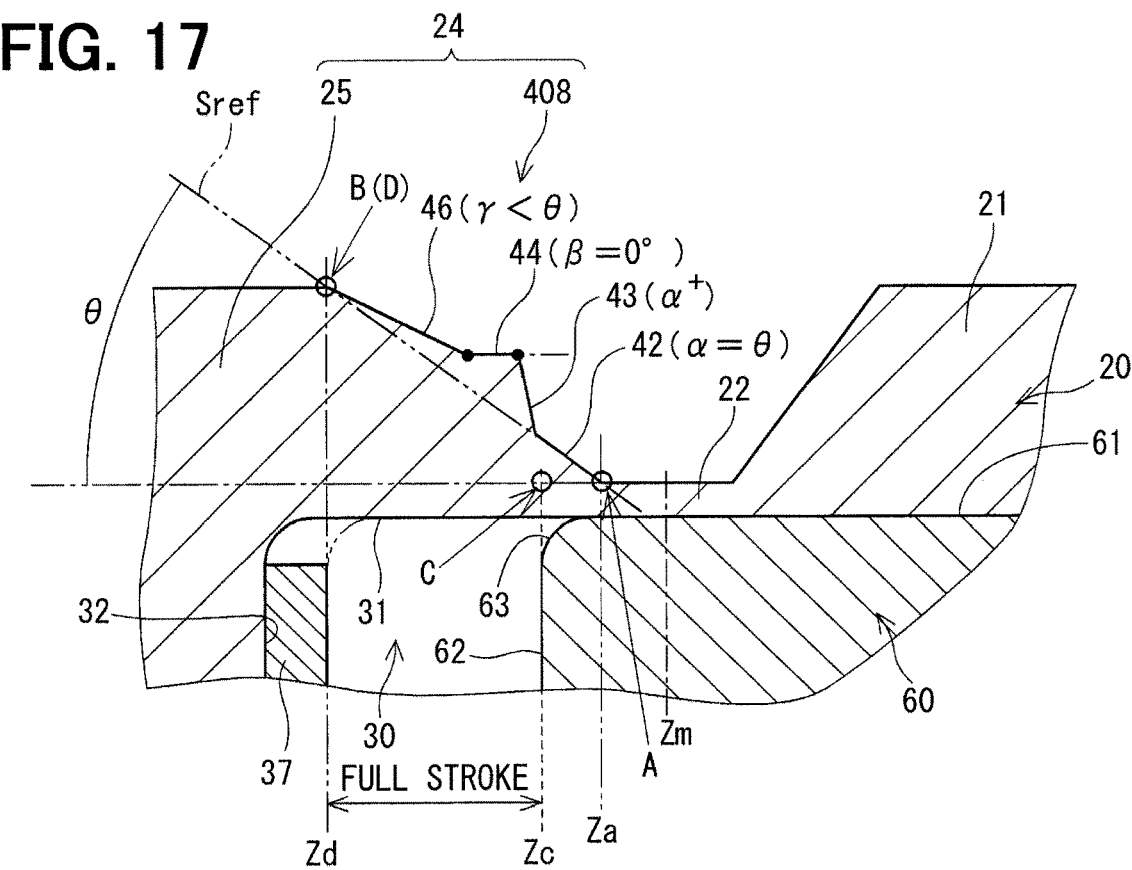
FIG. 17 is a partial enlarged view of a solenoid device according to an eighth embodiment.
Figure 18:
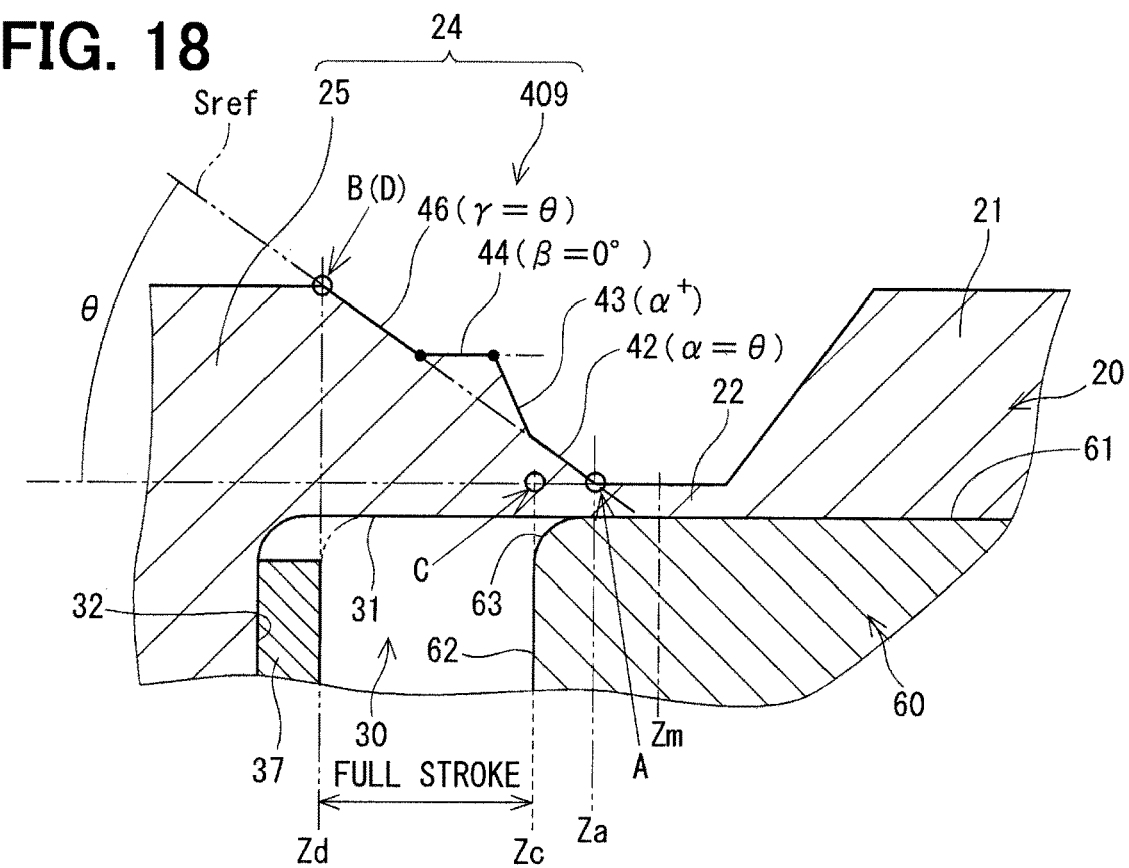
FIG. 18 is a partial enlarged view of a solenoid device according to a ninth embodiment.

Each of the diameter-increasing portions 408, 409 of the eighth and ninth embodiments respectively shown in FIGS. 17 and 18 additionally includes the quasi-first angle segment 43, which serves as the fourth angle segment and is located between the first angle segment 42 and the second angle segment 44, in comparison to the diameter-increasing portion 401 of the first embodiment. The quasi-first angle $\alpha^+$ is set to be larger than the first angle $\alpha$, and the first angle $\alpha$ is set to be the same as the reference angle $\theta$ of the reference conical surface Sref. In the first to seventh embodiments, there is the relationship of "$\alpha$>0". In contrast, in the eighth and ninth embodiments, there is the relationship of "$\alpha$=$\theta$". Therefore, in the respective diameter-increasing portions 408, 409, the first angle segment 42, which is located in the range from the A-point to the B-point, is placed along the reference conical surface Sref.

Furthermore, in the eighth embodiment, there is the relationship of "$\theta$>$\gamma$" where the third angle $\gamma$ is smaller than the reference angle $\theta$. In contrast, in the ninth embodiment, there is the relationship of "$\theta$=$\gamma$" where the third angle $\gamma$ is equal to the reference angle $\theta$. Therefore, in the diameter-increasing portion 409 of the ninth embodiment, the first angle segment 42 and the third angle segment 46, which are located in the range from the A-point to the B-point, are placed along the reference conical surface Sref. Furthermore, there is satisfied the relationship of "$\alpha$=$\gamma$=$\theta$". Therefore, in the eighth embodiment, there is satisfied the angle condition of "($\theta$=)$\alpha$>$\gamma$>$\beta$", and in the ninth embodiment, there is satisfied the angle condition of "($\theta$=)$\alpha$=$\gamma$>$\beta$." Even in the eighth and ninth embodiments, the effects and advantages, which are similar to those of the first embodiment, are implemented.

Tenth Embodiment

Figure 19:
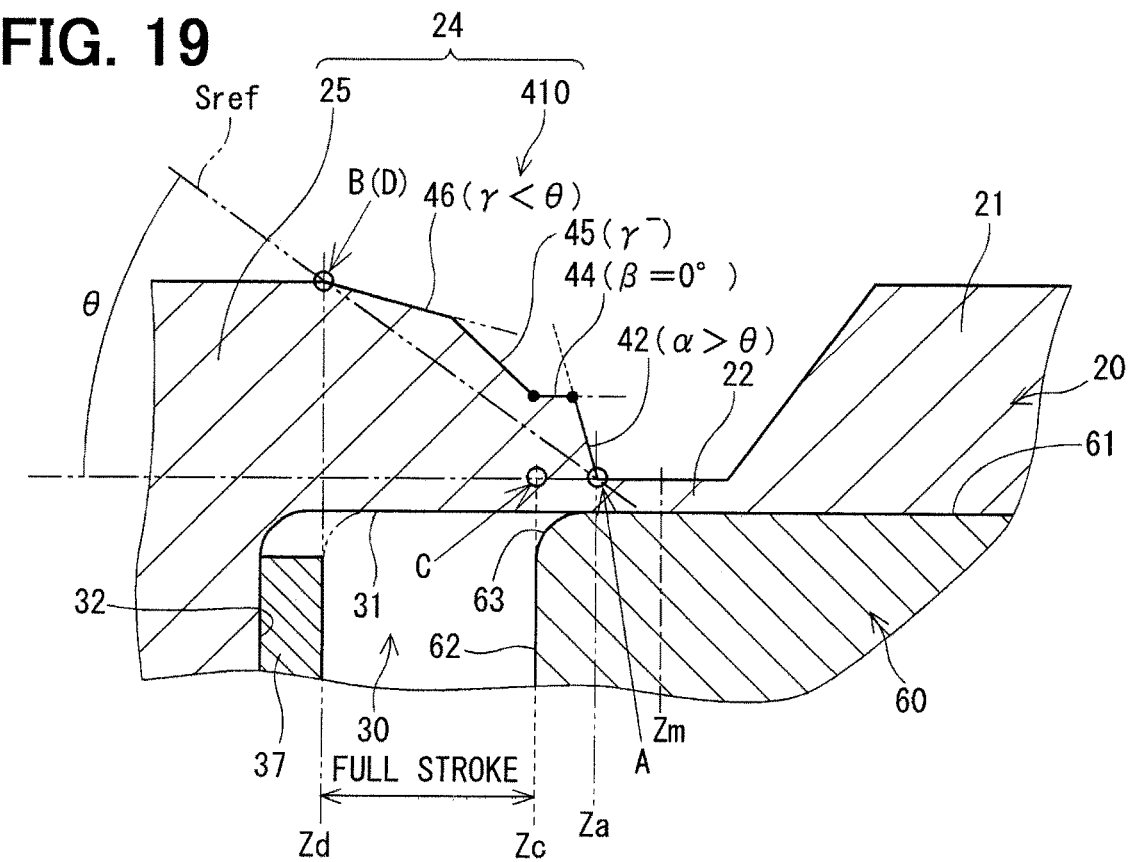
FIG. 19 is a partial enlarged view of a solenoid device according to a tenth embodiment.

The diameter-increasing portion 410 of the tenth embodiment shown in FIG. 19 additionally includes a quasi-third angle segment 45, which serves as the fourth angle segment and is located between the second angle segment 44 and the third angle segment 46, unlike the diameter-increasing portion 401 of the first embodiment. A quasi-third angle $\gamma^-$ is set to be larger than the third angle $\gamma$, and the third angle $\gamma$ is set to be larger than the second angle $\beta$. Therefore, there is satisfied the angle condition of $\neq$>$\gamma$>$\beta$. Here, it should be noted that the angle condition is not applied to the quasi-third angle $\gamma^-$.

Other Embodiments (a) In the seventh to tenth embodiments, there are described the examples, in each of which the diameter-increasing portion includes the fourth angle $\alpha^+$ or $\gamma^-$ in addition to the basic three angles $\alpha$, $\beta$, $\gamma$. In accordance therewith, the diameter-increasing portion may be configured to have a fifth or more angles between the first angle $\alpha$ and the second angle $\beta$, or between the second angle $\beta$ and the third angle $\gamma$. In such a case, the minimum angle among the angle(s), which is/are located between the first angle $\alpha$ and the third angle $\gamma$, may be interpreted as the second angle $\beta$.

(b) The application of the solenoid device of the present disclosure should not be necessarily limited to the oil pressure control valve of the automatic transmission or another type of fluid control valve, and the solenoid device of the present disclosure may be applied to any other type of device that controls the control output amount, such as the pressure, the flow rate, according to the amount of displacement of the output shaft. Furthermore, the solenoid device of the present disclosure may be applied in an actuator, such as a locking mechanism that simply switches between two modes of "opening" and "closing" through movement of the plunger. Even in such a case, the movable member can start the operation by overcoming the urging load of, for example, the spring, from the early time, at which the electric current is low, with respect to the current response wave form applied to the movable member placed in the static friction state at the OFF-end. Therefore, the response time is shortened, and thereby the moving speed and the inertial force are appropriately limited upon the start of the operation. Thus, it is possible to obtain advantages of that the durability of the stopper member is improved, and the collision sound generated at the time of abutting the movable member against the stopper member is limited.

The present disclosure should not be limited to the embodiments described above, and various other embodiments may be implemented without departing from the scope of the present disclosure.

What is claimed is:

1. A solenoid device comprising:
   a coil;
   a core that is placed on a radially inner side of the coil and has a plunger-receiving hole that extends along a central axis and has a bottom, wherein the core is configured to generate a magnetic attractive force when the coil is energized; and
   a plunger that is received in the plunger-receiving hole and is movable in an ON-side moving direction by the magnetic attractive force of the core from an OFF-end, which is defined as a position of the plunger in a deenergized state of the coil, to an ON-end, which is defined as a position of the plunger where the plunger contacts a stopper provided at a bottom surface of the plunger-receiving hole while the ON-side moving direction is defined as a direction from the OFF-end toward the ON-end along the central axis, wherein:
   the core includes:
      a main attracting portion, which has a relatively large wall thickness and is configured to generate the magnetic attractive force;
      a plunger support portion, which slidably supports the plunger; and
      one of a thin wall portion and an interrupting portion located between the main attracting portion and the plunger support portion, wherein the thin wall portion has a relatively small wall thickness and is configured to limit a flow of a magnetic flux generated upon energization of the coil, and the interrupting portion interrupts between the main attracting portion and the plunger support portion;
   an end part of the main attracting portion, which is located at a side where the one of the thin wall portion and the interrupting portion is placed, includes a diameter-increasing portion that has an outer diameter, which is increased in a plurality of steps in a form of a taper from the one of the thin wall portion and the interrupting portion toward a thick wall portion of the main attracting portion;
   the diameter-increasing portion has at least three angle segments that include:
      a first angle segment, which includes a taper-start point located at the side where the one of the thin wall portion and the interrupting portion is placed;
      a third angle segment, which includes a taper-end point located at a side where the thick wall portion is placed; and
      a second angle segment, which is located between the first angle segment and the third angle segment;

in an axial cross-section of the diameter-increasing portion, in a case where the thin wall portion is provided between the main attracting portion and the plunger support portion as the one of the thin wall portion and the interrupting portion, an A-point, which is the taper-start point, is defined as an intersection between a radially outer surface of the thin wall portion and the first angle segment, or in a case where the interrupting portion is provided between the main attracting portion and the plunger support portion as the one of the thin wall portion and the interrupting portion, the A-point, which is the taper-start point, is defined as an intersection between an inner peripheral surface of the plunger-receiving hole and the first angle segment;

in a case where a radially outer surface of the thick wall portion is parallel with the central axis, a B-point, which is the taper-end point, is defined as an intersection between the radially outer surface of the thick wall portion and the third angle segment, or in a case where the radially outer surface of the thick wall portion is not parallel to the central axis while the third angle segment extends in the ON-side moving direction beyond a location of a distal end surface of the plunger held at the ON-end, the B-point, which is the taper-end point, is defined as an intersection between the third angle segment and an imaginary extension line of the distal end surface of the plunger held at the ON-end;

a reference conical surface is defined as an imaginary conical surface that is obtained by rotating a straight line, which connects between the A-point and the B-point, about the central axis; and the diameter-increasing portion is configured to satisfy both of a range condition and an angle condition;

the range condition is set such that that a radially outer surface of the first angle segment, a radially outer surface of the second angle segment and a radially outer surface of the third angle segment are located along the reference conical surface or on a radially outer side of the reference conical surface throughout an entire range from the A-point to the B-point; and the angle condition is set as follows:

ti $\alpha \geq \theta$, $\theta \geq \gamma$, $\theta > \beta$ $\alpha \geq \gamma > \beta$ where:

$\alpha$ denotes a first angle that is a gradient angle of the first angle segment;

$\beta$ denotes a second angle that is a gradient angle of the second angle segment;

$\gamma$ denotes a third angle that is a gradient angle of the third angle segment; and $\theta$ denotes a reference angle that is a gradient angle of the reference conical surface;

a gradient angle of the ON-side moving direction is defined as zero degrees; and the first angle, the second angle, the third angle and the reference angle are respectively assumed to take a positive value when the first angle segment, the second angle segment, the third angle segment and the reference conical surface are tilted from the ON-side moving direction toward a radially outer side.

2. The solenoid device according to claim 1, wherein:

a straight terminal point is defined as an intersection between:

one of a rounded corner portion and a chamfered portion, which is formed at a corner between the distal end surface and the outer peripheral surface of the plunger; and a straight portion of the outer peripheral surface of the plunger, which has a constant outer diameter; and when the plunger is held at the OFF-end, the straight terminal point is axially placed on a side of a center position of the one of the thin wall portion and the interrupting portion where the distal end surface of the plunger is placed.

3. The solenoid device according to claim 2, wherein when the plunger is held at the OFF-end, the straight terminal point is axially placed on a side of an axial position of the A-point where the distal end surface of the plunger is placed.

4. The solenoid device according to claim 1, wherein the second angle is zero degrees.

5. The solenoid device according to claim 1, wherein the first angle is equal to or larger than 90 degrees.

6. The solenoid device according to claim 1, wherein in the axial cross-section, at least one of the first angle segment, the second angle segment and the third angle segment is connected to another adjacent one of the first angle segment, the second angle segment and the third angle segment by a corresponding boundary that is connected by a curved line.

* * * * *